United States Patent
Rossetto et al.

(10) Patent No.: US 12,299,528 B2
(45) Date of Patent: *May 13, 2025

(54) SYSTEM AND METHOD TO DETERMINE WHETHER AN IMAGE CONTAINS A SPECIFIC BARCODE

(71) Applicant: Verity AG, Zurich (CH)

(72) Inventors: Fabio Rossetto, Zurich (CH); Markus Florian Hehn, Zurich (CH)

(73) Assignee: Verity AG, Zurich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/369,032

(22) Filed: Sep. 15, 2023

(65) Prior Publication Data
US 2024/0005115 A1   Jan. 4, 2024

Related U.S. Application Data

(63) Continuation of application No. 17/534,962, filed on Nov. 24, 2021, now Pat. No. 11,797,798.

(60) Provisional application No. 63/117,522, filed on Nov. 24, 2020.

(51) Int. Cl.
*G06K 7/14* (2006.01)
*B64U 10/14* (2023.01)
(Continued)

(52) U.S. Cl.
CPC ......... *G06K 7/1413* (2013.01); *G06V 10/761* (2022.01); *B64U 10/14* (2023.01);
(Continued)

(58) Field of Classification Search
CPC .. G06K 7/14; G06K 7/12; G06K 7/17; G06V 10/761; B64C 39/024
(Continued)

(56) References Cited

U.S. PATENT DOCUMENTS 10,131,052 B1   11/2018  Ibarz et al.
2008/0010304 A1*  1/2008  Vempala ............... G06F 16/355
(Continued)

OTHER PUBLICATIONS

Anonymous: "Barcode—Wikipedia", Nov. 19, 2020, retrieved from the Internet <Hts://en.wikipedia.org/w/index.php?title=Barcode&oldid=989474378#Symbologies>, 30 pages, [retrieved on Apr. 4, 2022].

(Continued)

*Primary Examiner* — Edwyn Labaze
(74) *Attorney, Agent, or Firm* — Haley Guiliano LLP

(57) ABSTRACT

Systems and methods are provided for determining whether an image or location contains a barcode. The systems and methods include comparing visual data extracted from an image to target visual data. The systems and methods also include comparing different portions of captured barcode data to corresponding portions of target barcode data. The systems and methods also include utilizing barcode formatting data when comparing or computing a similarity measure. The systems and methods also include causing a second image to be captured when no match is found in a first image. The systems and methods also include identifying a target barcode from a barcode database based on spatial information about where an image was captured. The systems and methods also include validating a barcode based on different regions of the barcode from two different images of the barcode. The systems and methods also include using two barcodes captured in an image.

20 Claims, 16 Drawing Sheets

(51) Int. Cl.
  *B64U 30/20*    (2023.01)
  *B64U 101/30*   (2023.01)
  *G06V 10/74*    (2022.01)

(52) U.S. Cl.
  CPC .......... *B64U 30/20* (2023.01); *B64U 2101/30* (2023.01); *B64U 2201/10* (2023.01)

(58) Field of Classification Search
  USPC ............ 235/462.01, 454, 375; 358/474–498; 250/274
  See application file for complete search history.

(56) References Cited

U.S. PATENT DOCUMENTS

| | | |
|---|---|---|
| 2009/0245694 A1 | 10/2009 | Sartor et al. |
| 2015/0081460 A1 | 3/2015 | Chong et al. |
| 2016/0189381 A1 | 6/2016 | Rhoads |
| 2017/0123418 A1 | 5/2017 | Erickson et al. |
| 2018/0032767 A1 | 2/2018 | Sakata |
| 2023/0214368 A1* | 7/2023 | Ye .......................... G06N 7/01 707/692 |

OTHER PUBLICATIONS

Cho, et al., "2D barcode detection using images for drone-assisted inventory management", 2018 15th International Conference on Ubiquitous Robots {UR}, IEEE, p. 461-465, abstract only (2018).
Invitation to Pay Additional Fees and Communication Relating to Results of Partial International Search, dated Mar. 11, 2022, issued in International Application No. PCT/EP2021/082898 (14 pages).

* cited by examiner

SYSTEM AND METHOD TO DETERMINE WHETHER AN IMAGE CONTAINS A SPECIFIC BARCODE

CROSS-REFERENCE TO RELATED APPLICATIONS

This application is a continuation of U.S. patent application Ser. No. 17/534,962, filed Nov. 24, 2021, which claims priority to U.S. Provisional Patent Application No. 63/117,522, filed on Nov. 24, 2020, the entire contents of which are hereby expressly incorporated by reference in their entireties.

INTRODUCTION

The present disclosure generally relates to methods and systems for reading or recognizing printed patterns, more specifically one-dimensional barcodes.

Barcodes are a reliable way of visually encoding information in a machine-readable form. A barcode visually represents data in a machine-readable format. In many implementations, a barcode encodes information by varying the width and spacing of parallel lines. They have several industrial applications and are used ubiquitously in retail to tag products. Barcodes are generally scanned using a laser scanner. A laser scanner reads barcodes by projecting a ray of collimated light on the barcode and using photodiodes to measure the reflected light. The ability to scan barcodes using standard cameras is becoming increasingly more common.

The process for reading a barcode with a camera may start by identifying the location of the barcode in the image. Then, for one-dimension barcodes, the one-dimensional barcode is extracted from the image. And finally, the extracted barcode (e.g., in vector form) is decoded using the symbology used to encode the barcode. In some embodiments, the decoding is performed as follows:
a. The values of the extracted barcode, vector $f$, are interpolated using an interpolation function $f_f(x)$.
b. The maxima and minima of $f_f(x)$ are identified. Maxima are assigned value 1 and minima are assigned value 0. The sequence of zero and one is encoded in a vector h.
c. The binary vector h is decoded using the barcode symbology used to encode the barcode.

Achieving the same level of robustness in scanning when using standard cameras in decoding, compared with a laser scanner, poses additional technical challenges. First, pictures captured with a camera may be out of focus, or they may be subject to motion blur resulting in blurred images. Second, the decoding of a barcode is limited by the spatial sampling frequency of the image sensor, resulting in poor resolution. If the Pixels Per Module (PPM), i.e. the width in pixels of the thinner line of the barcode is too small, the barcode cannot be decoded. Even with high resolution cameras, this limits the distance at which a barcode can be, for it to be decoded successfully. Third, the lines of a barcode may not appear parallel in an image, depending on the lens of the camera and the angle between the camera axis and the surface on which the barcode is printed, resulting in lens and perspective distortion. Fourth, if the camera and barcode move with respect to each other, the rolling shutter of the camera may cause the lines of the barcode to appear distorted also known as the rolling shutter effect. Fifth, glare can cause portions of the barcode to be obscured.

SUMMARY

The present disclosure relates to the detection and matching of barcodes. The message is the data to be encoded within the barcode. A symbology is a mapping from messages to barcodes. Several standardized symbologies exist, including, but not limited to EAN-13, UPC-A and Code 128.

The present disclosure, in some embodiments, makes use of interpolation functions. Given a vector $g \in R^N$ and a support vector $x_g \in R^N$, an interpolation function is a function $f_g$ such that:

$$f_g(x_g[i])=g[i] \forall i \in [0,N-1]$$

In some implementations, $f_g$ is required to be differentiable and have finite energy. $f_g$ is referred to as the interpolation function of g on support $x_g$.

In some embodiments, it is not necessary to decode a barcode. Rather, what is of interest is whether an image contains a barcode that encodes a given message with a known symbology or not. This message is referred to herein as the target message or target barcode.

In some embodiments, a system determines whether an image contains a target message and produces a measure of the likelihood of the image to contain said message. In some situations, the system can determine whether an image contains a target barcode even if the image is too degraded for the barcode contained therein to be successfully decoded. The systems and methods herein can cope with images of partially occluded barcodes and images of barcodes with a spatial frequency higher than the Nyquist sampling frequency of the camera that captured the image. Accordingly, the systems and methods of the present disclosure overcome technical challenges with using images for scanning. In addition, the systems and methods of the present disclosure provide technical improvements to warehouse systems for quickly and efficiently performing scans using images (e.g., for inventory validation).

In some embodiments, methods and systems are provided for determining whether an image contains target visual data. An image that contains visual data is received and the visual data is extracted from the image into a first vector. A value measuring similarity is computed between the first vector and a second vector representing the target visual data. In some embodiments, the value measuring similarity is computed by calculating an interpolation function from the first vector or the second vector and determining discrepancy between the first vector and the second vector based on the interpolation function to calculate a value measuring similarity. Whether the image contains the target visual data is determined based on the computed value measuring similarity.

In some embodiments, the image is captured using an autonomously controlled vehicle (e.g., and autonomously controlled aerial vehicle). The image may be of a storage area in a warehouse. For example, the image may be captured in response to an inventory validation task or as part of a general inventory checking process that is periodically performed.

In some embodiments, the target visual data is obtained from a target message database. In some embodiments, the target visual data is encoded into the second vector. In some embodiments, the target visual data comprises a barcode and the second vector comprises information representing barcode start data, barcode encoded data, and barcode checksum data.

In some embodiments, an interpolation function is calculated from both the first vector and the second vector to generate first and second interpolation functions. In some embodiments, the interpolation function scales the first and/or second vectors to a predetermined length.

In some embodiments, methods and systems are provided for determining whether there is a match between visual data from an image and the target visual data. The visual data is extracted from the image into a first vector and a first portion of the first vector is compared to a first portion of a second vector representing target visual data to determine a first measure of similarity. A second portion of the first vector is compared to a second portion of a second vector to determine a second measure of similarity. Whether there is a match between the visual data and the target visual data is determined based on the first measure of similarity and the second measure of similarity.

In some embodiments, determining whether there is a match comprises applying a first criteria to the first measure of similarity to determine whether the first measure of similarity is sufficient and in response to determining that the first measure of similarity is not sufficient, performing the comparison of the second portion of the first vector to the second portion of the second vector. In some embodiments, the second portion of the first vector is a subset of the first vector, and determining whether there is a match comprises applying a second criteria to the second measure of similarity to determine whether the second measure of similarity is sufficient. In some embodiments, the second criteria is stricter than the first criteria In some embodiments, the first portion corresponds to one or more of company prefix, serial reference, shipper reference, consignment reference, trade item number, product code, or shipping data, and the second portion corresponds to a subset of the first portion, where the second portion has higher uniqueness in a barcode database than data of the first portion not included in the second portion.

In some embodiments, determining whether there is a match comprises applying first criteria to the first measure of similarity to determine whether the first measure of similarity is sufficient. In response to determining that the first measure of similarity is not sufficient, it is determined whether an artifact is present in the image that obscures a first region of the visual data and the second portion of the first vector is selected to correspond to a second region of the visual data that is not obscured by the artifact.

In some embodiments, methods and systems are provided for determining whether extracted barcode data matches a target barcode. An image of a location where a target barcode is expected to be found (e.g., a storage area in a warehouse) is received and the barcode data is extracted from the image into a first vector. The first vector comprises a first section corresponding to encoded payload data and a second section corresponding to barcode formatting data. Payload data of the target barcode is received (e.g., from a barcode database of a warehouse management system) and a second vector is generated based on the received payload data of the target barcode. A first section of the second vector corresponds to the received payload data of the target barcode and a second section of the second vector corresponds to barcode formatting data of the target barcode (e.g., a start marker, a center marker, an end marker, or a check digit). A value measuring similarity is computed between the first vector and the second vector based on the first and second sections of the first vector and the first and second sections of the second vector. Whether the extracted barcode data matches the target barcode is determined based on the value measuring similarity.

In some embodiments, whether an artifact is present in the image is determined based on the second sections of the first and second vectors. For example, the second section of the first vector can be compared to the second section of the second vector to determine if an artifact is present.

In some embodiments, the second vector is generated by encoding the payload data of the target barcode into numbers representing a visual barcode.

In some embodiments, an interpolated vector is generated based on the first vector or the second vector. In some embodiments, computing the value measuring similarity between the first vector and the second vector is based on the interpolated vector.

In some embodiments, methods and systems are provided for performing inventory verification. A first image is captured, along a first travel path, where a barcode is expected to be found. Barcode data is extracted from the first image and a matching process is performed between the extracted barcode data and data representing the barcode that is expected to be found. In response to determining no match, a second travel path is caused to be followed to capture a second image of where the barcode is expected to be found. A characteristic of the second travel path is different than a corresponding characteristic of the first travel path.

In some embodiments, a vehicle is caused to travel the first travel path to capture the first image and the same vehicle is caused to travel the second travel path. In some embodiments, the vehicle comprises an aerial vehicle, the first travel path comprises a first flight path, and the second travel path comprises a second flight path.

In some embodiments, a first vehicle is caused to travel the first travel to capture the first image and a second vehicle is caused to travel the second travel path.

In some embodiments, the first travel path comprises a first speed and a first distance from where the barcode is expected to be found when the first image is captured and the second travel path comprises a second speed and a second distance from where the barcode is expected to be found when the second image is captured. In some embodiments, the characteristic of the second travel path that is different than a corresponding characteristic of the first travel path is the second speed and/or the second distance.

In some embodiments, causing the second travel path to be followed to capture the second image comprises generating one or more instructions for a person to follow to capture the second image.

In some embodiments, causing the second travel path to be followed to capture the second image comprises capturing a plurality of images. For example, the first image may comprise a first portion of a pallet and the plurality of images, in aggregate, may comprise a second larger portion of the pallet (e.g., an entirety of the pallet).

In some embodiments, methods and systems are provided for determining whether an image contains a barcode. The image and spatial location information about where the image was captured is received. Based on the spatial information, a target barcode is identified from a barcode database. Barcode data of the image is compared to the target barcode and whether the image contains the target barcode is determined based on the comparison.

In some embodiments, the spatial location information is embedded in the image and received with the image. For example, the image may be captured and the spatial location information is associated with the captured image. The spatial location information may comprise a location in a warehouse. In some implementations, the image is captured by an autonomously controlled vehicle, the spatial location information comprises a location of the autonomously controlled vehicle in a warehouse, and the barcode database is maintained by a warehouse management system.

In some embodiments, the barcode database comprises a data structure comprising a warehouse location field and a one or more barcode fields.

In some embodiments, the barcode data from the image is decoded to obtain barcode payload data. The barcode payload data may be compared to target payload data of target barcode.

In some embodiments, the barcode data from the image is extracted into a first vector and target payload data of the target barcode data is encoded into a second vector. The comparing of the barcode data of the image to the target barcode may be based on the first vector and the second vector.

In some embodiments, methods and systems are provided for determining whether a location contains target visual data. First barcode data is extracted from a first image captured at the location where the target visual data is expected to be found. The first barcode data is partially validated as matching the target visual data such that a first region of the first barcode data matches a first region of the target visual data and a second region of the first barcode data does not match a second region of the target visual data. Second barcode data is extracted from a second image captured at the location where the target visual data is expected to be found. The first barcode data is validated as matching the target visual data in response to matching a second region of the second barcode data to the second region of the target visual data.

In some embodiments, validation is performed of the first barcode data on a region that comprises the first region and second region. In response to failing to validate the region of the first barcode data that comprises the first region and the second region, separate validations are performed on the first region and the second region.

In some embodiments, the first image and the second image comprise two different overlapping views of the location.

In some embodiments, the first image is captured using an autonomous vehicle at a first location of the autonomous vehicle and the second image is captured using the autonomous vehicle at a second location of the autonomous vehicle. The first image and the second image maybe captured using the autonomous vehicle while following a predefined travel path. The predefined travel path may comprise a distance of the path from the location and a speed of the autonomous vehicle.

In some embodiments, the first barcode data is partially validating as matching the target visual data by: computing a first similarity metric for the first region of the first barcode data, computing a second similarity metric for the second region of the first barcode data, comparing the first similarity metric to a first similarity threshold, and comparing the second similarity metric to a second similarity threshold.

In some embodiments, the second region of the second barcode data corresponds to the second region of the first barcode data and the system and method further comprise validating the second region of the second barcode data as matching the second region of the target visual data.

In some embodiments, the first barcode data is extracted from the first image into a first vector, where the first region of the first barcode data comprises a first region of the first vector and the second region of the first barcode data comprises a second region of the first vector. Target payload data of the target visual data is encoded into a second vector that comprises barcode formatting data, where the first region of the target visual data comprises a first region of the second vector and the second region of the target visual data comprises a second region of the second vector.

In some embodiments, methods and systems are provided for determining whether a location contains target visual data. First barcode data and second barcode data are extracted from an image captured at the location where the target visual data is expected to be found. The first barcode data is partially validated as matching the target visual data such that a first region of the first barcode data matches a first region of the target visual data and a second region of the first barcode data does not match a second region of the target visual data. The second barcode data is partially or fully validated as matching the target data and the location is determined to contain the target visual data based on the partial validation of the first barcode data and the partial or full validation of the second barcode data.

In some embodiments, methods and systems are provided for determining whether an image contains a target barcode. An image (e.g., of a storage area in a warehouse) is received that contains first barcode data (e.g., a shipping container code) and second barcode data (e.g., product identifier). The first barcode data and the second barcode data are extracted. The first barcode data is compared to the target barcode and the second barcode data is compared to a secondary barcode. In response to determining a low confidence match of the first barcode data to the target barcode and a sufficient match of the second barcode data to the secondary barcode, the image is determined to contain the target barcode.

In some embodiments, in response to determining the low confidence match of the first barcode data to the target barcode and an insufficient match of the second barcode data to the secondary barcode, the image is determined to not contain the target barcode.

In some embodiments, the secondary barcode comprises the target barcode.

In some embodiments, comparing the second barcode data to the secondary barcode is performed in response to determining the low confidence match of the first barcode data to the target barcode.

In some embodiments, comparing the first barcode data to the target barcode comprises determining a similarity metric and comparing the similarity metric to one or more similarity thresholds to determine whether there is a low confidence match or a high confidence match. Similarly, comparing the second barcode data to the secondary barcode may comprise determining a secondary similarity metric and comparing the secondary similarity metric to a similarity threshold to determine whether there is a sufficient match.

In some embodiments, the target barcode comprises target payload data and the target payload data is encoded into a second vector that comprises barcode formatting data. The comparing the first barcode data to the target barcode comprises comparing the first barcode data, in vector form, to the second vector.

In some embodiments, the systems of the present disclosure comprise processing circuitry configured to perform the methods of the present disclosure. In some embodiments, the systems of the disclosure also comprise communication circuitry for receiving images and target barcode information and for output computed values and results of the methods. In some embodiments, the present disclosure also includes non-transitory computer-readable medium storing computer-readable instructions thereon, wherein the instructions comprise instructions for performing the methods of the present disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
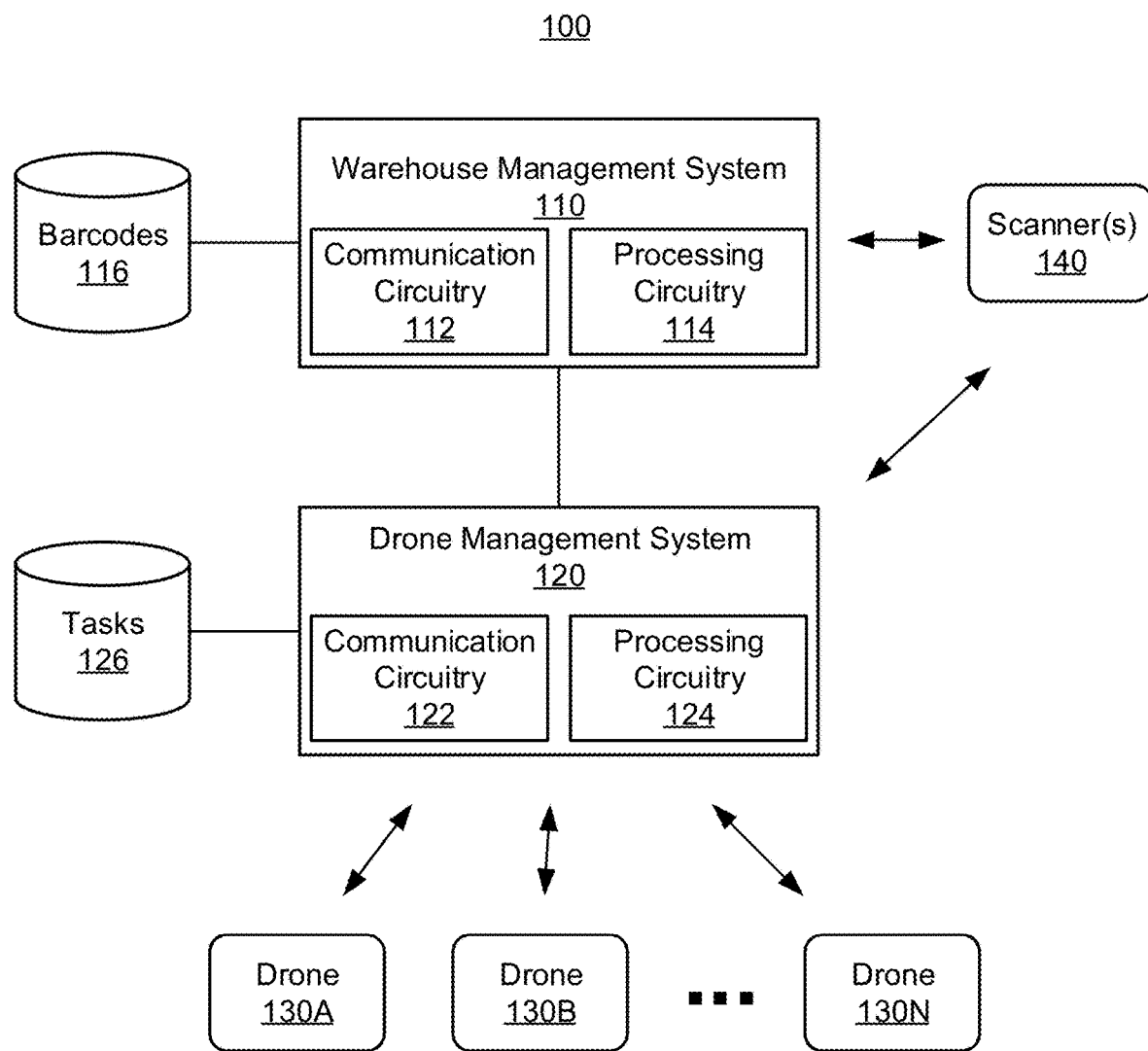
FIG. 1 shows a block diagram of an illustrative warehouse system, in accordance with some embodiments of this disclosure.

FIG. 1 shows a block diagram of an illustrative warehouse system 100, in accordance with some embodiments of this disclosure. System 100 may be implemented in any suitable warehouse or location that stores and manages goods, materials, or any other types of objects. For example, system 100 may be implemented in large distribution facilities or small stores. System 100 includes a warehouse management system 110 and drone management system 120.

Warehouse management system 110 controls warehouse operations. As shown, warehouse management system 110 is communicatively coupled to a barcode database 116, scanner(s) 140, and drone management system 120. Depending on the type of warehouse, warehouse management system 110 may control warehouse operations starting from when objects enter the warehouse until the object leaves the warehouse. Warehouse management system 110 can manage warehouse tasks such as the picking of goods from shelves for shipping and storing received goods on shelves. Warehouse management system 110 tracks the location of objects within the warehouse using barcodes. When objects arrive, the objects are scanned using, for example scanners 140. In some situations, the objects arrive with one or more barcodes already on the objects and one or more of these barcodes are used by warehouse management system 110 for tracking purposes. In other situations, barcodes are added to the objects.

As used herein, barcode refers to any visually encoded information that is machine-readable. Barcodes include one-dimension barcodes (e.g., having parallel lines having varying widths and spacing) and two-dimension barcodes (e.g., having patterns of shapes such as rectangles, dots, and hexagons). Barcodes can be black and white or have a range of colors.

Barcode database 116 stores identification information (e.g., 12-digit codes) that are used by warehouse management system 110 to track each object in the warehouse. For example, when a barcode of an object is scanned, barcode database 116 associates the barcode (e.g., the identification information, target message, or payload of the barcode) with the object. In some embodiments, the barcode database 116 is referred to as a target message database. Additional information may also be stored such as the object contents, arrival date, and warehouse location (e.g., aisle, bay, level, and position or rack, level, and space). Database 116 may store information in a data structure that comprises one or more fields for each type of information stored (e.g., a warehouse location field, one or more barcode fields, etc.). When an object needs to be moved, the warehouse management system 110 may generate an instruction to move the object from a first location in the warehouse to a second location of the warehouse. In some warehouses, the instruction is sent to a worker who uses a forklift to manually move the object. Each location in the warehouse may also include a barcode. Accordingly, when a worker moves an object, the worker can use a scanner 140 to scan the location barcode and the object barcode at the first location and then after moving the object the worker can scan the object barcode again and the location barcode at the second barcode. Warehouse management system 110 receives the scan information from the scanner 140 and updates the location information for the object. Accordingly, warehouse management system 110 maintains barcode database 116 to ensure it is up to date.

For various reasons, the location information for objects in a warehouse may be inaccurate. For example, a worker may move an object to an incorrect location or a worker may forget to scan a location barcode after moving an object and thus the location information managed by warehouse management system 110 may include errors. These errors can impact upstream and downstream operations and the overall efficiency of a warehouse. Accordingly, warehouse management system 110 may request inventory validation tasks to be performed to confirm the location of objects in the warehouse. In some embodiments, the inventory validation tasks can be performed manually by workers using scanners 140. For example, a worker can scan an object in a warehouse location using a scanner 140 and the barcode can be compared to a barcode expected to be found at that location. In some embodiments, as explained below, the inventory validation tasks can be transmitted to drone management system 120 to be performed autonomously or semi-autonomously.

Warehouse management system 110 may comprise processing circuitry 114 which may comprise hardware, software or any combination thereof, such as, for example, one or more central processing units (CPUs) configured to execute instructions stored in non-transitory computer-readable media (e.g., memory) to implement operating system(s) and applications of warehouse management system 110 and perform and/or control various operations of the warehouse. Warehouse management system 110 may further comprise communication circuitry 112 configured to transmit and receive communications from barcode database 116, scanners 140, and drone management system 120. Communication circuitry 112 may also be configured to transmit and receive communications between components within warehouse management system 110.

The memory of processing circuitry 114 may comprise one or more of, for example, Random Access Memory (RAM), Read Only Memory (ROM), EEPROM, ASIC, optical storage, magnetic storage, flash memory, solid state memory, or any combination thereof, or any other suitable medium used to store data. The memory may be configured to store one or more instructions (e.g., in the form of an application) executable by processing circuitry 114 to, for example, manage the locations of objects in the warehouse and to request inventory validation tasks. Any suitable programming languages may be employed to implement such instructions and applications, e.g., Java, C, Python, Go, JavaScript (e.g., React library), Typescript, Handlebar, React, etc.

Drone management system 120 controls drones within the warehouse. As shown, drone management system 120 is communicatively coupled to tasks database 126, scanner(s) 140, drones 130A, 130B, . . . , and 130N (collectively referred to as drones 130), and warehouse management system 110. Drone management system 120 controls drones 130 to perform tasks, such as tasks in tasks database 126. For example, drone management system 120 may receive inventory validation tasks from warehouse management system 110 and store them in tasks database 126. Drone management system 120 may then assign the inventory validation tasks to specific ones of drones 130 to perform. In some embodiments, drones 130 are autonomously controlled vehicles (e.g., ground vehicles or aerial vehicles) that are capable of navigating through the warehouse to specific locations. Drones 130 may be any mobile robot such as ground based robots and aerial robots. Drones 130 may include one or more sensors such as a camera that are used to capture images of locations in the warehouse. The images, and barcode data captured therein, can be used to validate the location information managed by warehouse management system 110. Drone management system 120 may also assign inventory validation tasks to be performed by workers using scanners 140. For example, if a drone 130 is obstructed from reaching a location, the inventory validation task can be performed by a worker. As another example, if barcode data is not able to be sufficiently captured with a drone 130 at a location, then instructions can be generated for having a worker use a scanner 140 to scan the barcode at a location.

Drone management system 120 may comprise processing circuitry 124 which may comprise hardware, software or any combination thereof, such as, for example, one or more central processing units (CPUs) configured to execute instructions stored in non-transitory computer-readable media (e.g., memory) to implement operating system(s) and applications of drone management system 120 and manage task for drones 130. Drone management system 120 may further comprise communication circuitry 122 configured to transmit and receive communications from tasks database 126, drones 130, scanners 140, and drone management system 120. Communication circuitry 122 may also be configured to transmit and receive communications between components within drone management system 120.

The memory of processing circuitry 124 may comprise one or more of, for example, Random Access Memory (RAM), Read Only Memory (ROM), EEPROM, ASIC, optical storage, magnetic storage, flash memory, solid state memory, or any combination thereof, or any other suitable medium used to store data. The memory may be configured to store one or more instructions (e.g., in the form of an application) executable by processing circuitry 124 to, for example, manage tasks such as inventory validation tasks. Any suitable programming languages may be employed to implement such instructions and applications, e.g., Java, C, Python, Go, JavaScript (e.g., React library), Typescript, Handlebar, React, etc.

It will be understood that while warehouse management system 110 and drone management system 120 are depicted as separate systems, in some embodiments the functionality can be included in a single system. For example, the functionality performed by drone management system 120 may be included in warehouse management system 110.

Figure 2:
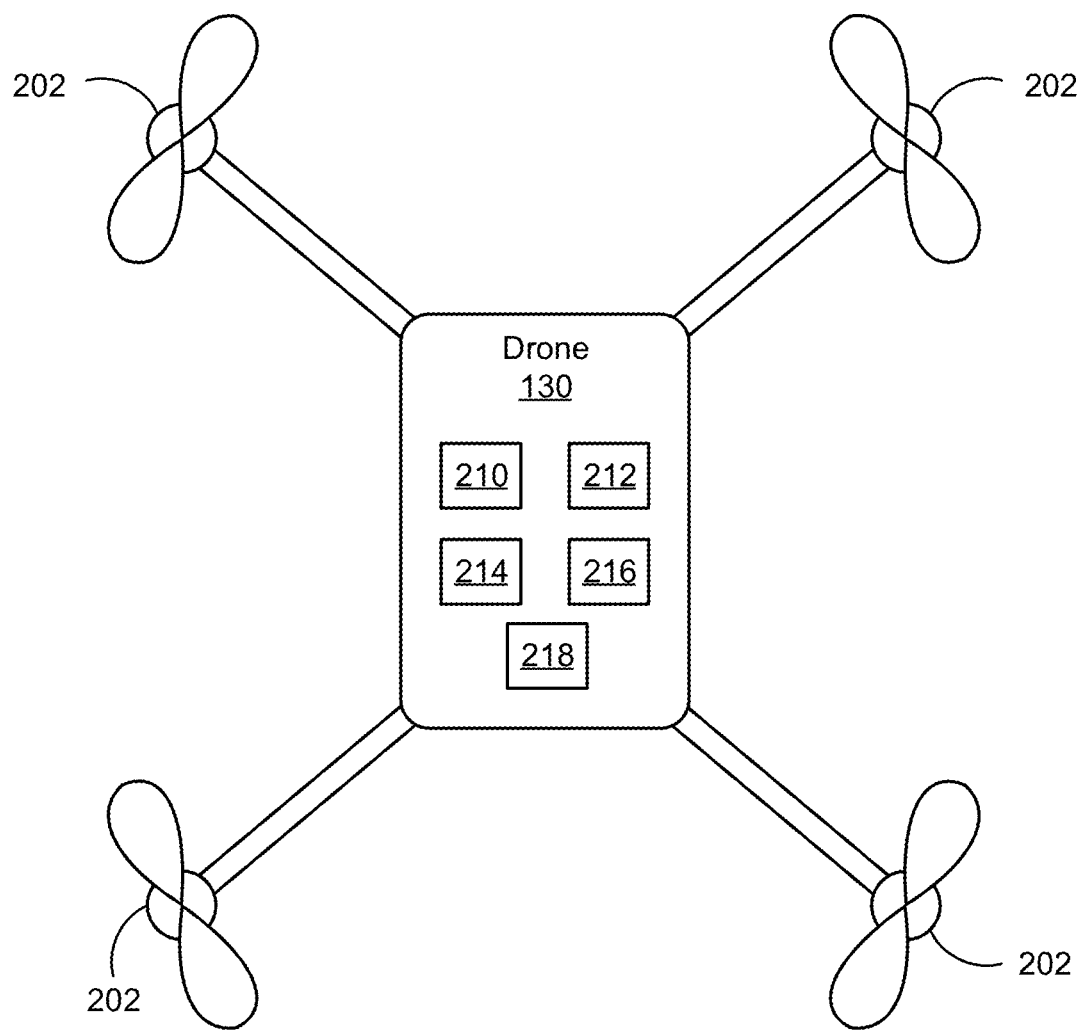
FIG. 2 shows a block diagram of an illustrative drone, in accordance with some embodiments of this disclosure.

FIG. 2 shows a block diagram of an illustrative drone 130, in accordance with some embodiments of this disclosure. Drone 130 includes four actuators 202 that are used to rotate respective propellers that allow the drone 130 to fly and control its movement through space. Drone 130 may also include one or more sensors 210 that are used to assist in navigating through space. Sensors 210 may include a localization sensor (e.g., an indoor positioning sensor) for determining the position of drone 130. For example, when drone 130 is used with system 100 of FIG. 1, the localization sensor can be used to determine the position of drone 130 in a warehouse based on signals from anchors positioned within the warehouse. Sensors 210 may also include collision avoidance sensors such vision sensors, ultrasonic sensors, infrared (IR) sensors, LiDAR sensors, or the like.

Drone 130 may comprise communication circuitry 212 configured to transmit and receive communications from, for example, drone management system 120. For example, drone 130 may receive one or more inventory validation tasks from drone management system 120. Drone 130 may also comprise memory 216 for storing the inventory validation tasks. Memory 216 may comprise one or more of, for example, Random Access Memory (RAM), Read Only Memory (ROM), EEPROM, ASIC, optical storage, magnetic storage, flash memory, solid state memory, or any combination thereof, or any other suitable medium used to store data. Memory 216 may also store an environment map such as a map of a warehouse showing free space, obstructions (e.g., walls, columns, and storage racks), and inventory locations. The inventory validation tasks may be received in any of a number of formats. For example, the inventory validation tasks may include a location in the warehouse and drone 130 may be configured to determine a route to the location based on the environment map to perform the validation. As another example, the drone management system may include one or more available routes for drone 130 to take to perform the validation. In some embodiments, the inventory validation task may also include a target barcode that is expected to be at the location. The target barcode may comprise a barcode number that corresponds to the barcode payload.

Drone 130 may comprise processing circuitry 214 configured to manage the operation of drone 130. Processing circuitry 214 may comprise hardware, software or any combination thereof, such as, for example, one or more central processing units (CPUs) configured to execute instructions stored in non-transitory computer-readable media (e.g., memory 216) to implement operating system(s) and applications (e.g., route navigation and inventory validation). For example, processing circuitry 214 may determine a route to a location based on a current location of drone 130 using the free space indicated by the environment map. In some embodiments, processing circuitry 214 determines a shortest path or fastest path to a location.

Drone 130 may comprise camera 218 configured to capture images. Camera 218 may be used by drone 130 to capture images of locations within, for example, a warehouse. The images can be used to perform inventory validation by, for example, comparing barcode data from the image to a target barcode expected to be at the location. For example, processing circuitry 214 may extract the barcode visual data from the image and compute a similarity measure based on the extracted barcode data and target barcode. Processing circuitry 214 may transmit, using communication circuitry 212, the results of the inventory validation to drone management system 120. In some embodiments, processing circuitry 214 may transmit the captured image to drone management system 120 such that drone management system 120 performs the comparison or computes the similarity measure.

The methods of the present disclosure can be implemented on any one or a combination of processing circuitry 114, 124, and 214. Accordingly, it will be understood that processing circuitry, as used herein, includes processing circuitry distributed across multiple devices, system, or networks. It will also be understood that the processing circuitry may be configured to execute instructions stored in non-transitory computer-readable media and such media and stored instructions may also be distributed across multiple devices, system, or networks.

Figure 3:
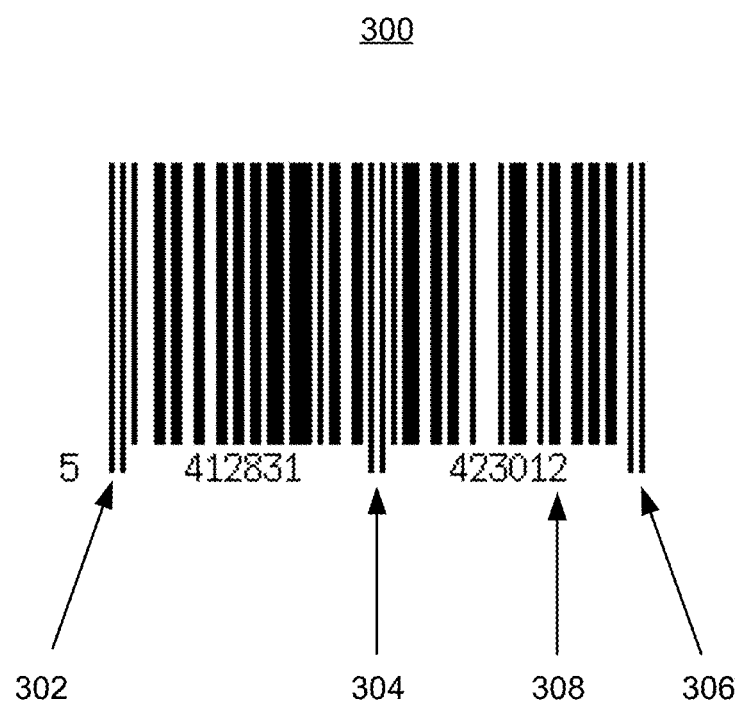
FIG. 3 shows an illustrative barcode, in accordance with some embodiments of this disclosure.

FIG. 3 shows an illustrative barcode 300, in accordance with some embodiments of this disclosure. Barcodes can be generated using any number of barcode standards. Barcode 300 as illustrated is a thirteen-digit EAN-13 barcode, which is commonly used standard in global trade to identify a specific retail product type, in a specific packaging configuration, from a specific manufacturer. Barcode 300 is generated by encoding 13 digits into a pattern of vertical lines along with lines representing barcode formatting data. Accordingly, different portions of barcode 300 correspond to the encoded digits and the barcode formatting data. Portions 302 and 306 of barcode 300 each correspond to two vertical lines and the space between them. Portion 302 is a start marker and portion 306 is an end marker for barcode 300. Portion 304 is a marker for the center of barcode 300. Portion 304 corresponds to the two vertical lines and the three spaces that are between and adjacent to the vertical lines. Portions 302, 304, and 306 correspond to barcode formatting data. The remaining portions of barcode 300 correspond to the encoding of thirteen digits.

In some embodiments, the thirteen digits of encoded data in barcode 300 correspond to the barcode payload (also referred to herein as a barcode number and message). In some embodiments, one or more digits of the thirteen digits is used for barcoding formatting data. For example, if the data to be encoded is twelve digits, the remaining digit may be used as checksum data (e.g., check digit 308), which can be used to determine whether the twelve digits were correctly decoded. As used herein, the term barcode formatting data also includes the checksum data because it is used in the decoding process. Thus, in this example, the barcode payload is 12 digits and the remaining information represented in barcode 300 is the barcode formatting data. It will be understood that the barcode 300 is merely illustrative and any type of barcode standard or type can be used in accordance with the present disclosure.

In some embodiments the system and methods of the present disclosure determine whether an image contains a target message. In some implementations, a probability is assigned to the image containing the target message. The input to the system can be an image and the output can be a single number. In some implementations, the number is 0 if the image does not contain a barcode encoding the target message, and 1 if it does. In other implementation the number is between 0 and 1 and indicates the probability of the image to contain the barcode.

Figure 4:
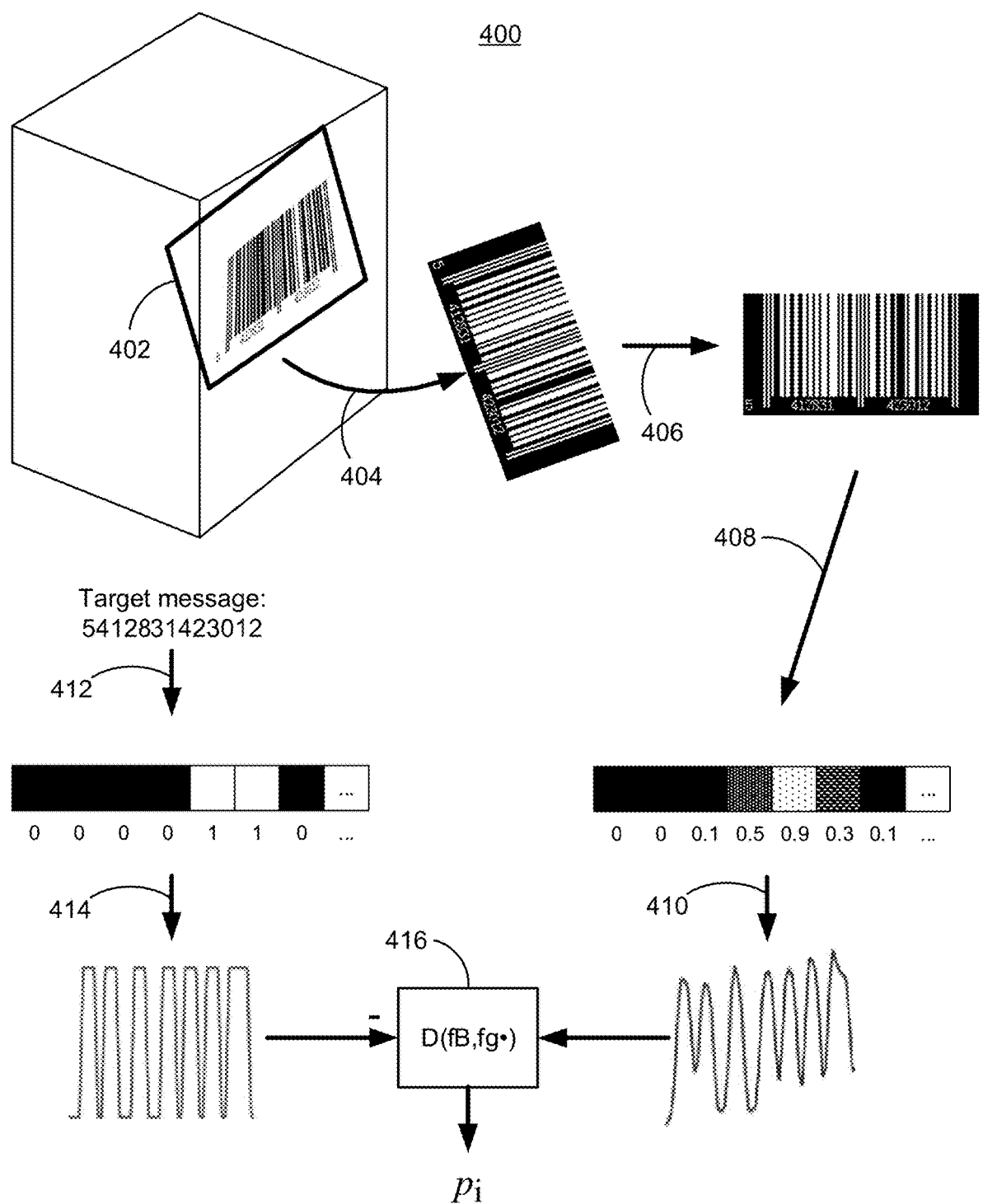
FIG. 4 is a flowchart of an illustrative process for determining whether a captured image includes a target barcode, in accordance with some embodiments of this disclosure.

FIG. 4 is a flowchart of an illustrative process 400 for determining whether a captured image includes a target barcode, in accordance with some embodiments of this disclosure. In various embodiments, the individual steps of process 400 may be implemented by one or more components of the devices and systems of FIGS. 1 and 2. Although the present disclosure may describe certain steps of process 400 (and of other processes described herein) as being implemented by certain components of the devices and systems of FIGS. 1 and 2, this is for purposes of illustration only, and it should be understood that other components of the devices and systems of FIGS. 1 and 2 may implement those steps instead.

At 402, processing circuitry (e.g., 114, 124, and/or 214) may perform barcode detection on an image, which may also be referred to as barcode localization, to determine where in the image one or more barcodes are located. In one approach, this is achieved by segmenting white rectangles within the image. In another approach, the Hough transform is used to identify regions containing many parallel lines. The output of the barcode detection step may be a list of regions of interest (ROI), each ROI being a patch of the image containing a single barcode. In some embodiments, the image may be captured by drone 130 at a location in the warehouse using camera 218 as part of an inventory validation request. For example, the image may be of goods stored at a storage location on a storage rack. However, it will be understood that process 400 may be performed on any image where a target barcode is expected.

At 404, each ROI found at 402 is inverted, i.e., for each pixel in the ROI, its intensity is changed from I to $I_{MAX}-I$, where $I_{MAX}$ is the maximum intensity a pixel can have. In some embodiments, step 404 is omitted.

At 406, processing circuitry (e.g., 114, 124, and/or 214) may begin barcode extraction. Barcode extraction may begin by rotating each ROI and applying perspective distortion correction so that the barcode is horizontal and all barcode bars are parallel and vertical. At 408, barcode extraction may continue. In some implementations, at 408 a horizontal line cutting through the center of the barcode is selected to form a 1D representation of the barcode. The result is a M dimensional vector $f \in R^N$ of pixel intensities. In some implementations, instead of considering the pixels on the central line of the barcode, the intensity values are summed (or median determined, or the process is repeated for multiple lines) along the vertical direction of the barcode. This approach is more robust in case of partially occluded barcodes. The output of barcode extraction at 408, for a 1D barcode, is a list of one-dimensional vectors, each associated with a different barcode detected in the image. Each vector in the list may have a different dimensionality. FIG. 4 depicts illustrative pixel colors and corresponding intensity values (e.g., normalized between 0 and 1 where 0 corresponds to black and 1 corresponds to white).

At 410, processing circuitry (e.g., 114, 124, and/or 214) performs barcode interpolation. Barcode interpolation may be performed using any suitable technique for generating a vector having, for example, a fixed length. In some embodiments, for each one-dimensional vector $g \in R^N$ identified in barcode extraction, the following may be performed:

a. The support vector $x_g \in R^N$, containing the values (0, 1, . . . , N−1) is paired with g.

b. Given the interpolation function $f_g$ of g on support $x_g$, the first rising edge of $f_g$ as well as its last falling edge are found. This can be done by deriving $f_g$ and finding the position of the first maxima and last minima of $$\frac{df_g}{dx}.$$

The location of the first rising edge of $f_g$ is $x_r$ and the location of the last falling edge is $x_f$.

c. The support $x_g$ of g is scaled and translated to a new support $x_{g'}$ as follows:

$$x_{g'} = \frac{1}{x_f - x_r}(x_g - x_r)$$

The new support $x_{g'}$ is such that $x_r$ is mapped to zero and $x_f$ is mapped to 1. The interpolation function $xf_{g'}$ is the interpolation function of g on support $x_{g'}$.

d. $f_{g'}$ is normalized such that $$\int_{x_{g'}} |f_{g'}(x)|^2 dx = 1$$

In other words, $\theta_{g'}$ is scaled as to be a unit energy function.

At 412 and 414, processing circuitry (e.g., 114, 124, and/or 214) performs target message encoding. For example, the barcode message or payload of the barcode expected to be found in the image may be encoded to be compared to the vector extracted from the image. In some embodiments, the encoding is performed as follows:

a. At 412, the target message is encoded into a vector of zeros and ones using the symbology (e.g., standard) of the barcode expected to be found in the image. The vector is inverted, meaning that zeros are changed into ones and ones into zeros. The inverted vector is referred to as B having dimensionality M. The inverted vector is depicted in FIG. 4.

b. At 414, steps b-e are performed. Starting at b, a support vector $x_B$ is associated to B, containing the values (0, 1, . . . , M−1).

c. Given the interpolation function $f_B$ of B on support $x_B$, the first rising edge of $f_B$ as well as its last falling edge are found. In some implementations, these can be found exactly based on knowledge of B. For example, in implementations using a linear interpolation for the interpolation function, if the first 1 in B is at index B[i], then the rising edge of $f_B$ is at $$\frac{x_B[i] - x_B[i-1]}{2}$$

d. The new support $x_{B'}$ is obtained by scaling and translating $x_B$ so that the rising edge of $f_B$ is at x=0 and the falling edge is at x=1, as done at step c of 410 for $f_g$. $f_{B'}$ is the interpolation function of B on support $x_{B'}$.

e. $f_{B'}$ is scaled as to have unit energy, as done for $f_{g'}$ at step d of 410.

At 416, processing circuitry (e.g., 114, 124, and/or 214) performs barcode matching. For each one-dimensional vector identified in barcode extraction, a value p i is computed, which measures the similarity of the vector to the target message encoded as a barcode. In some embodiments, p has a value between 0 and 1, where 1 is achieved when the extracted barcode matches exactly the encoding of the target message. For each barcode extracted in the image with interpolation function $f_{g'}$, the quantity $p_i$ is calculated as follows:

$$p_i = d(f_{g'}, f_{B'}) = \langle f_{g'} - f_{B'}, f_{g'} - f_{B'}\rangle, \text{ where}$$

"$\langle , \rangle$" indicates the inner product on the Hilbert space of square integrable functions. That is:

$$d(f_{g'}, f_{B'}) = \int_{-\infty}^{+\infty}(f_{g'}(x) - f_{B'}(x))(f_{g'}(x) - f_{B'}(x))dx$$

All the $p_i$ calculated for each barcode are aggregated in a single value $p \in [0,1]$ using the following formula:

$$p = 1 - \prod_i (1 - p_i)$$

In some implementations, the value p is the output of process 400. In other implementations, p is compared to a threshold value α. If p>α, then a 1 is returned, otherwise a 0 is returned.

It will be understood that various modification may be made to process 400 in accordance with the present disclosure. For example, the vectors may be compared without inverting the vectors. As another example, two interpolations may not be performed. Instead, one of the vectors can be interpolated to match the length of the other vector.

Figure 5:
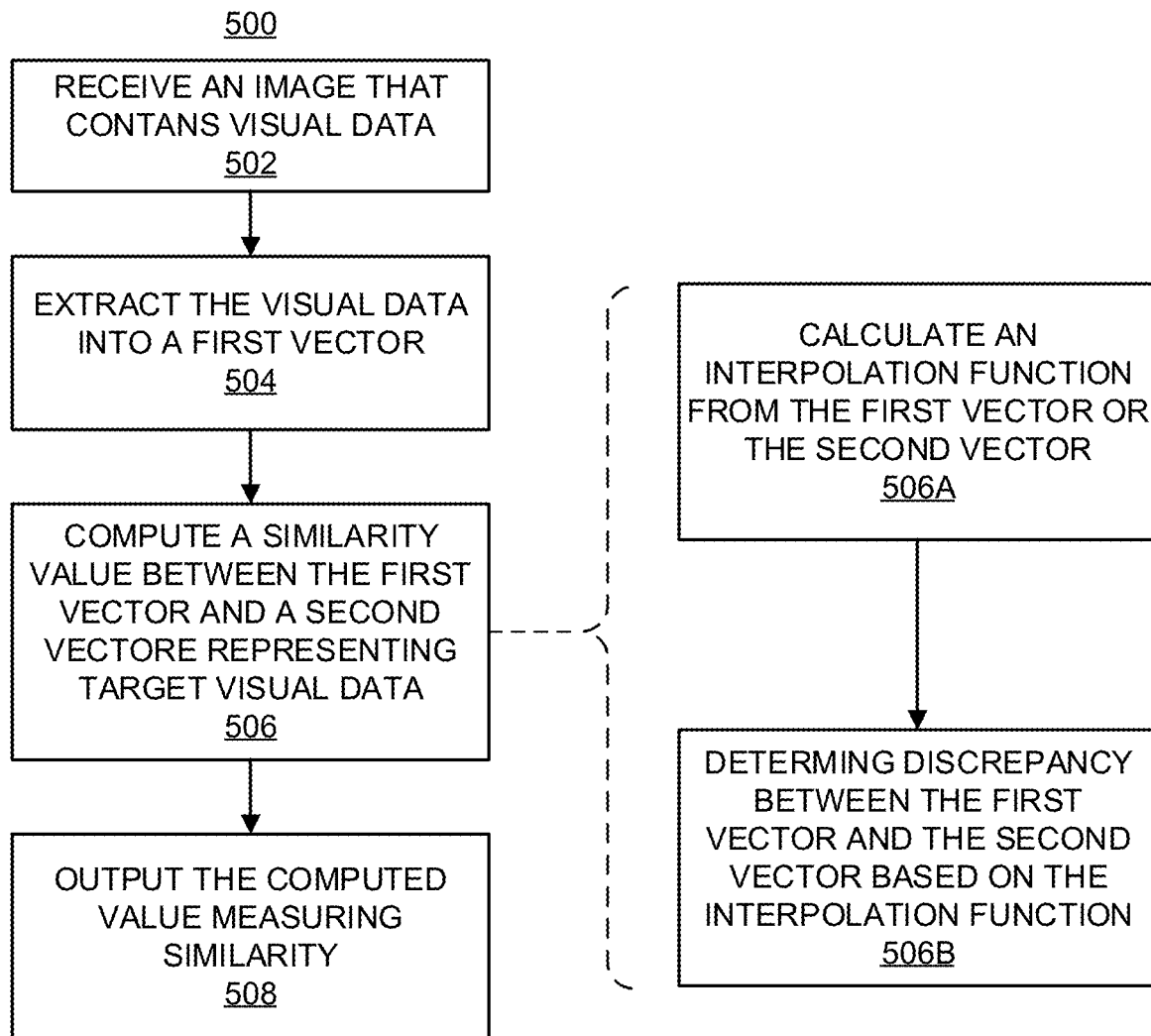
FIG. 5 is a flowchart of an illustrative process for computing a similarity value, in accordance with some embodiments of this disclosure.

FIG. 5 is a flowchart of an illustrative process 500 for computing a similarity value, in accordance with some embodiments of this disclosure. In various embodiments, the individual steps of process 500 may be implemented by one or more components of the devices and systems of FIGS. 1 and 2. Although the present disclosure may describe certain steps of process 500 (and of other processes described herein) as being implemented by certain components of the devices and systems of FIGS. 1 and 2, this is for purposes of illustration only, and it should be understood that other components of the devices and systems of FIGS. 1 and 2 may implement those steps instead.

At 502, processing circuitry (e.g., 114, 124, and/or 214) may receive an image that contains visual data. In some embodiments, the image may be captured by drone 130 at a location in the warehouse using camera 218 as part of an inventory validation request. For example, the image may be of goods stored at a storage area on a storage rack in warehouse. However, it will be understood that process 500 may be performed on any image that contains visual data. In some embodiments, the receiving is performed by communication circuitry 212 receiving the image from camera 218 or processing circuitry 214 receiving the image from communication circuitry 212 or memory 216. In some embodiments, the receiving is performed by warehouse management system 110, drone management system 120, or components thereof.

At 504, processing circuitry (e.g., 114, 124, and/or 214) may extract the visual data into a first vector. In some embodiments, the extraction is performed using steps 402-408 of FIG. 4. In some embodiments, the extraction is performed directly on the image without using the inversion and rotating steps of 404-406 of FIG. 4. For example, once the visual data is detected (e.g., using pattern detection), pixel values corresponding to a centerline, or other line, of the visual data may be extracted from the image. In some embodiments, one or more corrections may be applied to account for perspective distortion.

At 506, processing circuitry (e.g., 114, 124, and/or 214) may compute a similarity value between the first vector and a second vector representing target visual data. In some embodiments, the second vector represents the visual appearance of a target barcode. For example, a barcode number or message may be encoded, using a barcode encoding standard, into a vector. In some embodiments, the vector includes barcode formatting data such as barcode start data and barcode checksum data. In some embodiments the second vector is retrieved from memory. The similarity value may be computed using any technique described herein. In some implementations, the similarity value may be computed using step 416 of FIG. 4. In some implementations, the similarity value may be computed using a cross correlation calculation (e.g., after adjusting the vectors to be zero mean vectors of the same length and each having unit energy). Any other technique may be used that determines a value that indicates the similarity between the two vectors.

In some embodiments, 506 includes steps 506A and 506B. At 506A, processing circuitry (e.g., 114, 124, and/or 214) may calculate an interpolation function from the first vector or the second vector. For example, the interpolation may be performed on the first vector to have the first vector match the length of the second vector. As another example, the interpolation may be performed on the second vector to have the second vector match the length of the first vector. As yet another example, the interpolation may be separately performed on the first vector and the second vector to match a predetermined length vector (e.g., a length having a sufficient resolution to represent the barcode symbology). At 506B, processing circuitry (e.g., 114, 124, and/or 214) may determine discrepancy between the first vector and the second vector based on the interpolation function. For example, differences may be calculated between the interpolated first vector and the second vector or between the interpolated second vector and first vector. The differences may be summed or summed and normalized to determine the discrepancy. The discrepancy may be a single value corresponding to the similarity value.

At 508, processing circuitry (e.g., 114, 124, and/or 214) may output the computed value measuring similarity. For example, processing circuitry 214 may output the value using communication circuitry 212 to drone management system 120. In some embodiments, process 500 is performed in response to an inventory validation request and the similarity value indicates whether the image contains a target barcode. In some embodiments, processing circuitry 214 compares the value measuring similarity to a threshold to determine if the image contains the target visual data. The greater the similarity, the greater the confidence that the image contains the target visual data. In some embodiments, the threshold is selected based on empirical data to ensure that there is high confidence when it is determined that the image contains the target visual data.

Processing an image to determine if it contains a barcode, such as a target barcode, can present challenges. For example, lighting conditions, such as glare, can cause a portion of the barcode to be obscured. As another example, the barcode itself may be partially damaged or dirt or other markings may partially cover the barcode. These conditions may make it impossible to process the barcode using conventional techniques to determine the barcode payload or message. However, the techniques of the present disclosure make it possible to determine if a partially obscured barcode matches a barcode expected to be in an image by processing portions of the barcode data.

Figure 6:
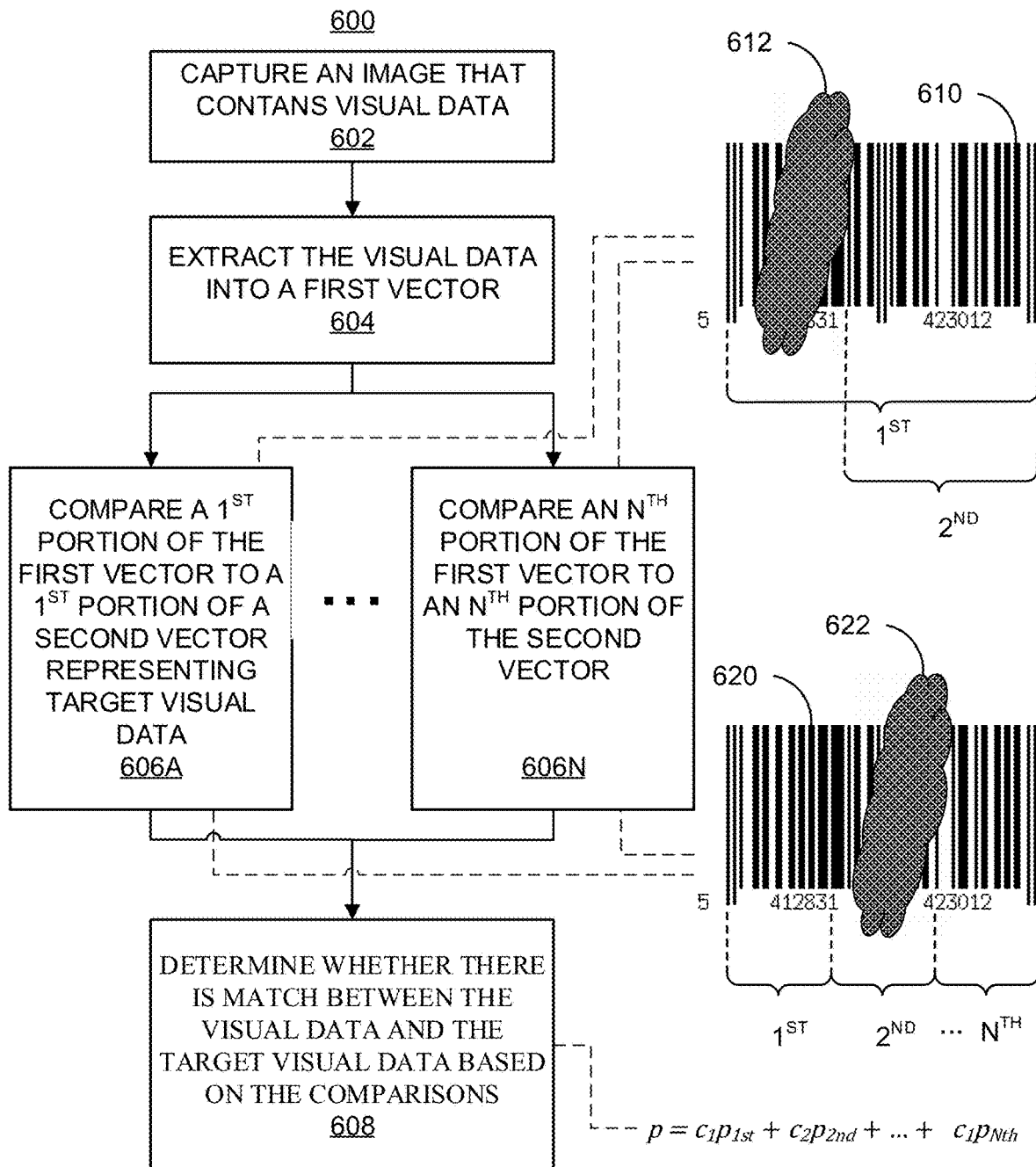
FIG. 6 is a flowchart of an illustrative process for determining whether there is a barcode match using multiple portions of the barcode, in accordance with some embodiments of this disclosure.

FIG. 6 is a flowchart of an illustrative process 600 for determining whether there is a barcode match using multiple portions of the barcode, in accordance with some embodiments of this disclosure. In various embodiments, the individual steps of process 600 may be implemented by one or more components of the devices and systems of FIGS. 1 and 2. Although the present disclosure may describe certain steps of process 600 (and of other processes described herein) as being implemented by certain components of the devices and systems of FIGS. 1 and 2, this is for purposes of illustration only, and it should be understood that other components of the devices and systems of FIGS. 1 and 2 may implement those steps instead.

At 602, a camera such as camera 218 captures an image that contains visual data. In some embodiments, the image is captured at a location in a warehouse in response to an inventory validation request. For example, the image may be of goods stored at a storage area on a storage rack in warehouse. However, it will be understood that process 400 may be performed on any image at any location that contains visual data.

At 604, processing circuitry (e.g., 114, 124, and/or 214) may extract the visual data into a first vector. In some embodiments, the extraction is performed using steps 402-408 of FIG. 4. In some embodiments, the extraction is performed directly on the image without using the inversion and rotating steps of 404-406 of FIG. 4. For example, once the visual data is detected (e.g., using pattern detection), pixel values corresponding to a centerline, or a different line or lines, of the visual data may be extracted from the image. In some embodiments, one or more corrections may be applied to account for perspective distortion.

At 606 (i.e., 606A-N), processing circuitry (e.g., 114, 124, and/or 214) may compare different portions (e.g., first, second, etc. portions) of the first vector to a second vector representing target visual data. In some embodiments, the second vector represents the visual appearance of a target barcode. For example, a barcode number or message may be encoded, using a barcode encoding standard, into the second vector. In some embodiments, the second vector includes barcode formatting data such as barcode start data and barcode checksum data. In some embodiments the second vector is retrieved from memory. The comparisons may be performed using any technique described herein. In some implementations, the comparisons may be computed using step 416 of FIG. 4. In some implementations, the comparisons are performed using a cross correlation calculation (e.g., after adjusting the vector portions to be zero mean vectors of the same length and each having unit energy). Any other technique may be used that compares portions of the vectors to determine the similarity between the portions. Each comparison may result in a determination of a measure of similarity.

At 608, processing circuitry (e.g., 114, 124, and/or 214) may determine whether there is a match between the visual data and the target visual data based on the comparisons at 606. For example, if all of the comparisons at 606 indicate a high level of similarity between the analyzed portions, the processing circuitry will determine there to be match. However, even if one or more portions indicate a low level of similarity, the processing circuitry may still determine there to be a match.

Barcode 610 shows an illustrative barcode captured at 602 having an obscured region 612. Obscured region 612 can cause one or more comparisons at 606 to indicate a low level of similarity even though the captured barcode matches the target barcode. In some embodiments, the first portions of the vectors compared at 606 correspond to the entire barcode. Because of obscured region 612, the comparison of the first portions may not indicate a high level of similarity. Also, because the right side of the barcode is not obscured, the comparison of the first portions may also not indicate a low level of similarity. Accordingly, the comparison may not sufficiently indicate whether or not there is match. However, by performing one or more additional comparisons on different portions (e.g., subsets) of the vectors, sufficient confidence may be obtained. For example, if the second portions of the vectors compared at 606 primarily correspond to the right side of the barcode, then the comparison of the second portions will indicate a high level of similarity. In some embodiments, these two comparisons will result in a determination that there is a match between the visual data in the image and the target visual data. In some embodiments, different criteria are applied to the different portions at 608. For example, when analyzing the second portions, which are a subset of the first portions, stricter criteria may be applied for determining whether there is a match. In some embodiments, the first portion corresponds to one or more of company prefix, serial reference, shipper reference, consignment reference, trade item number, product code, or shipping data. In some embodiments, a second portion corresponds to a subset of the first portion and a third portion corresponds to a subset of the second portion. In some embodiments, the data included in the subsets may be data that has higher uniqueness in a barcode database such as 116. Data having higher uniqueness may correspond to values of data that appear less frequently in the barcode database. The more unique the data, the more likely a match means that the visual data in the image corresponds to the target visual data. In some embodiments, steps 606 and 608 are performed iteratively. For example, 606 may start by comparing the entire first vector with the entire second vector. If there is a sufficiently high similarity, then 608 may determine that there is a match. However, if there is not sufficiently high similarity (e.g., by applying a threshold criteria check to a measure of similarity), 606 may be performed again by comparing one or more different portions (e.g., subsets) of the vectors.

In some embodiments, 606 may perform N comparisons on N portions of the vectors. For example, the vectors may be divided into N portions and the respective portions are compared at 606. The vectors may be divided into N portions, each having the same size or different sizes. In some embodiments, the portions may correspond to different information. One or more portions may correspond to different information in the barcode payload. For example, the barcode payload may be structured such that different digits correspond to different information such as, for example, company prefix, serial reference, shipper reference, consignment reference, trade item number, product code, or shipping data. The dividing of a barcode into N portions is illustrated on barcode 620, which has an obscured region 622. By dividing the vector corresponding to the barcode into smaller portions, obscured region 622 will only affect a subset of the portions. For example, while the second portion of barcode 620 may have a low level of similarity, the other portions may have a high level of similarity.

At 608, any suitable criteria or analysis may be applied to the comparisons performed at 606. In some embodiments, when a vector is divided into different portions, a single measure of similarity may be determined by summing the measures of similarity determined for the different portions. In some embodiments, the individual measures are equally weighted in the summation. In some embodiments, one or more different weights (e.g., $c_1$, $c_2$, etc.) are applied to each measure. For example, different portions of the vector may have different levels of importance. For example, some portions may include information that is common for a range of barcodes in a warehouse (e.g., a portion corresponding to company prefix) and other portions may include information that is less common for a range of barcodes (e.g., a portion corresponding to a serial number). In some embodiments, higher weights are applied to the portions containing less common information.

Figure 7:
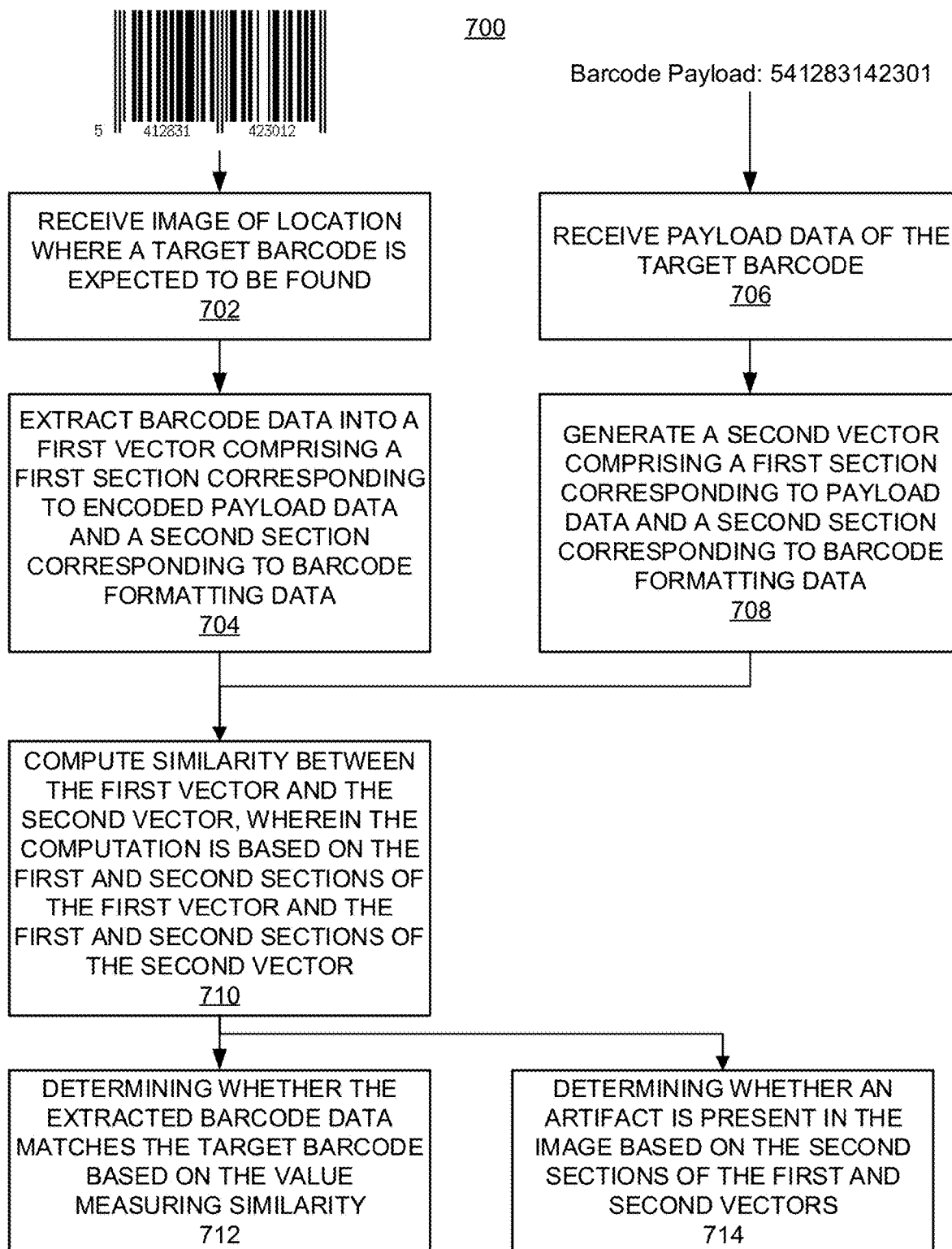
FIG. 7 is a flowchart of an illustrative process for using barcode formatting data to determine whether a barcode matches and for determining the presence of an artifact, in accordance with some embodiments of this disclosure.

FIG. 7 is a flowchart of an illustrative process 700 for using barcode formatting data to determine whether a barcode matches and for determining the presence of an artifact, in accordance with some embodiments of this disclosure. In various embodiments, the individual steps of process 700 may be implemented by one or more components of the devices and systems of FIGS. 1 and 2. Although the present disclosure may describe certain steps of process 700 (and of other processes described herein) as being implemented by certain components of the devices and systems of FIGS. 1 and 2, this is for purposes of illustration only, and it should be understood that other components of the devices and systems of FIGS. 1 and 2 may implement those steps instead.

At 702, processing circuitry (e.g., 114, 124, and/or 214) may receive an image of a location where a target barcode is expected to be found. In some embodiments, the image may be captured by drone 130 at a location in the warehouse using camera 218 as part of an inventory validation request. For example, the image may be of goods stored at a storage area on a storage rack in warehouse. However, it will be understood that process 700 may be performed on any image where a target barcode is expected to be found. In some embodiments, the receiving is performed by communication circuitry 212 receiving the image from camera 218 or processing circuitry 214 receiving the image from communication circuitry 212 or memory 216. In some embodiments, the receiving is performed by warehouse management system 110, drone management system 120, or components thereof.

At 704, processing circuitry (e.g., 114, 124, and/or 214) may extract the visual data into a first vector comprising a first section corresponding to encoded payload data and a second section corresponding to barcode formatting data. In some embodiments, the extraction is performed using steps 402-408 of FIG. 4. In some embodiments, the extraction is performed directly on the image without using the inversion and rotating steps of 404-406 of FIG. 4. For example, once the barcode is detected (e.g., using pattern detection), pixel values corresponding to a centerline, or a different line or lines, of the barcode may be extracted from the image. In some embodiments, one or more corrections may be applied to account for perspective distortion. In some embodiments, the first vector contains values representing the visual appearance of the entire barcode. Referring back to barcode 300 of FIG. 3, as an example, the entire barcode 300 includes formatting data (e.g., portions 302, 304, 306, and 308) and the barcode payload or message. Thus, different sections of the first vector correspond to payload data and the formatting data.

At 706, processing circuitry (e.g., 114, 124, and/or 214) may receive the payload data of the target barcode. For example, processing circuitry 214 may receive the payload data from drone management system 120. As another example, processing circuitry 124 may receive the payload data from warehouse management system 110, which in turn may receive it from barcode database 116. The payload data may be a number of digits. As shown, the payload data is 12 digits.

At 708, processing circuitry (e.g., 114, 124, and/or 214) may generate a second vector comprising a first section corresponding to payload data and a second section corresponding to barcode formatting data. In some embodiments, the payload data is encoded into the second vector using zeros and ones (e.g., corresponding to black and white colors of the barcode) using the symbology (e.g., standard) of the barcode expected to be found in the image. In some embodiments, multiple sections of payload data are separated from each other by multiple sections of barcode formatting data in the second vector.

At 710, processing circuitry (e.g., 114, 124, and/or 214) may compute a similarity value between the first vector and a second vector, where the computation is based on payload data portions and formatting portions of the vectors. In some embodiments, the formatting portions may include formatting data such as a start marker, end marker, center marker, and barcode checksum data. The similarity value may be computed using any technique described herein. In some implementations, the similarity value may be computed using step 416 of FIG. 4. In some implementations, the similarity value may be computed using a cross correlation calculation (e.g., after adjusting the vectors to be zero mean vectors of the same length and each having unit energy). Any other technique may be used that determines a value that indicates the similarity between the two vectors.

At 712, processing circuitry (e.g., 114, 124, and/or 214) may determine whether the extracted barcode data matches the target barcode based on the value measuring similarity. The greater the similarity, the greater the confidence that the image contains the target barcode. In some embodiments, the determination is made by comparing the value measuring similarity to a threshold. The threshold may be selected based on empirical data to ensure that there is high confidence when it is determined that the image contains the target barcode. The use of barcode formatting data in the comparison and when determining whether the extracted barcode data matches the target barcode, provides additional information than if only the barcode payload were used. In some embodiments, the additional information provides increased confidence in the determination at 712 than if only the barcode payload were used. In some embodiments, the additional information enables an accurate determination to be made even if there if a portion of the barcode payload that is obscured.

In some embodiments, process 700 includes step 714. At 714, processing circuitry (e.g., 114, 124, and/or 214) may determine whether an artifact is present in the image based on the second sections of the first and second vectors. When the barcode payload data of an image does not match the target payload data, this may mean that the image contains the wrong barcode or that there is an artifact (e.g., a part of the barcode is obscured). In some situations, it may not be possible to determine why there is no match. However, by computing the similarity between barcoding formatting sections of the barcode (e.g., the start marker, the center marker, and the end marker), it may be possible to determine the reason why there is no match. In some barcode symbology, certain barcode formatting data is the same between different barcodes. In some embodiments, if there is good similarity between the formatting data, then this may mean that the barcode in the image is different than the target barcode. However, if there is not good similarity (e.g., the start makers are not similar), then this may mean that there is an artifact obscuring the barcode or a part of the barcode. When an artifact is present, additional steps may need to be performed to determine what barcode is at the location where the image was taken. In some embodiments, if the start markers are not similar, but the center marker and the end marker are similar, then it may be determined that an artifact is obscuring the beginning of the barcode. Accordingly, in some embodiments, as explained in more detail further below, a portion of the barcode from the image (e.g., a portion excluding the beginning) can be selected and compared to determine if there is a match.

Figure 8:
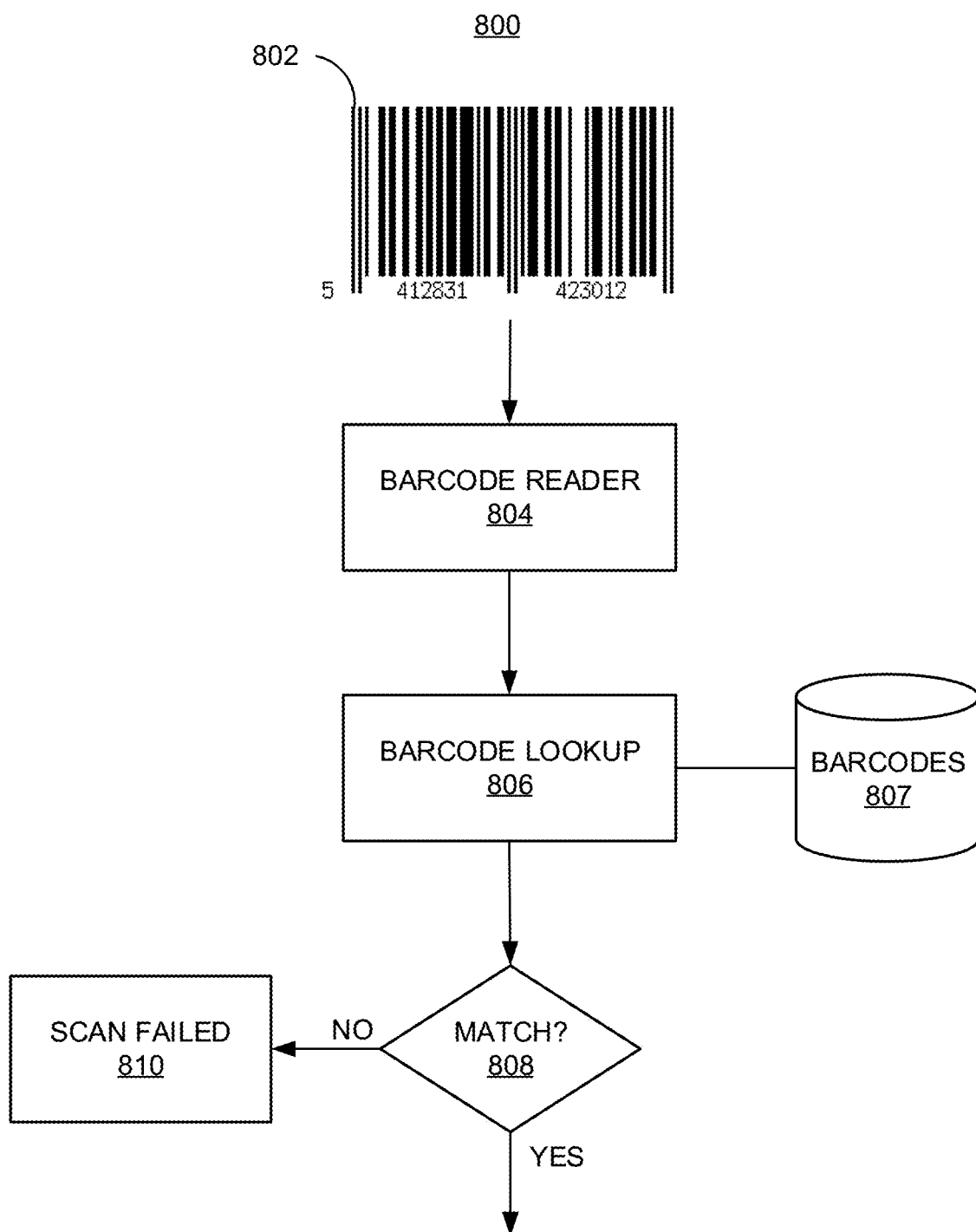
FIG. 8 is a flowchart of using a barcode reader to determine a match with a database of barcodes, in accordance with some embodiments of this disclosure.

The foregoing discussion describes systems and methods for analyzing visual data such as barcodes without, for example, decoding the visual data. This provides, for example, an efficient and convenient way to confirm whether visual data from an image matches what is expected to be captured in the image. In some embodiments, this analysis may be used together with barcode readers that decode barcodes (e.g., laser barcode readers or camera-based barcode readers). For example, if a match is not found from an image taken by drone 130 in a warehouse, it may not be clear whether the wrong barcode is at the location or whether the image does not include a sufficient representation of the barcode for comparison and matching. FIG. 8 is a flowchart 800 of using a barcode reader to determine a match with a database of barcodes, in accordance with some embodiments of this disclosure.

At 804, a barcode reader performs a scan of a barcode such as barcode 802. In some embodiments, the barcode reader is a laser scanner and implemented as part of scanners 140. The laser scanner reads barcodes by projecting a ray of collimated light on the barcode and using photodiodes to measure the reflected light. The laser scanner may include circuitry for decoding a detected barcode and outputting the barcode payload. In some embodiments, the barcode reader is a camera-based barcode reader that scans a barcode by capturing an image of the barcode, decodes the captured barcode, and outputs the barcode payload.

At 806, processing circuitry (e.g., 114, 124, and/or 214) may perform a barcode lookup operation to determine if the barcode payload obtained at 804 is found in a database of barcodes, such as barcode database 807. In some embodiments, barcode database 807 corresponds to barcode database 116. If there is no match at 808, then the process proceeds to 810 and the scan failed. A failed scan may mean that an improper barcode was detected or that the barcode was corrupted. If there is a match at 808, then the scan is successful.

In some embodiments, process 800 is performed when an inventory validation request fails to validate a target barcode (e.g., performed on an image captured by a drone 130). When this happens, warehouse management system 110 may generate a request (e.g., for a worker) to use a scanner 140 to determine what barcode is at the location where the inventory validation failed. In some embodiments, warehouse management system 110 (or any other component of FIGS. 1 and 2) may first try to decode the barcode data captured in the image to determine what barcode is located at the warehouse location, and process 800 may only be performed if barcode data cannot be successfully decoded.

Other approaches may also be utilized when barcode data in an image does not match a target barcode. In some situations, a match may not be found because the image is not of sufficient quality to successfully perform a comparison. A poor quality image may be caused by lighting or the distance between the barcode and the camera. Poor quality can also be caused by movement of the camera when the image is captured or when the barcode does not directly face the camera. When the barcode is at a high angle relative to the camera, there may not be sufficient pixel resolution to sufficiently correct for the perspective distortion in the capture image. Accordingly, when barcode data in a first image does not match a target barcode, a higher quality second image may be captured at the location and a second comparison may be performed.

Figure 9:
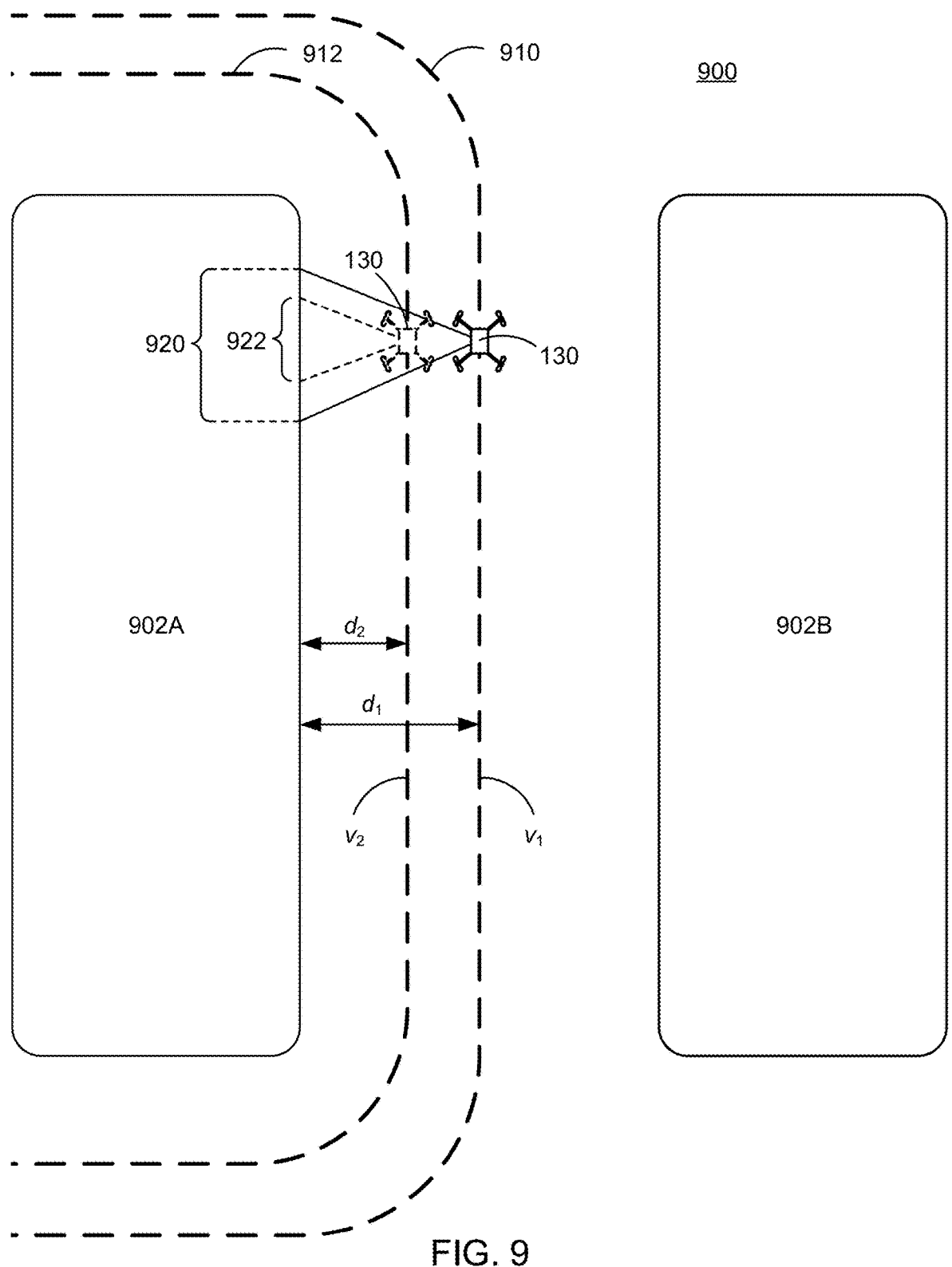
FIG. 9 shows an illustrative plan view of a warehouse and two paths, in accordance with some embodiments of this disclosure.

FIG. 9 shows an illustrative plan view of a warehouse 900 and two paths, in accordance with some embodiments of this disclosure. It will be understood that FIG. 9 shows a simplified partial view of a warehouse containing storage racks 902A and 902B. The space between storage racks 902A and 902B may be referred to as an aisle. In some embodiments, warehouse 900 is managed by warehouse management system 110 and drone management system 120.

In some embodiments, path 910 represents a first path taken by a drone 130 in the aisle between storage racks 902A and 902B. Path 910 is a distance $d_1$ away from storage rack 902A. In some embodiments, path 910 also has an associated velocity $v_1$. While flying along path 910, drone 130 captures an image of region 920 of storage rack 902A. In some embodiments, the image is captured as part of an inventory validation task. In response to failing to match barcode data in the captured image to the target barcode, a second image may be requested to be captured. For example, drone management system 120 may request the same drone 130 to capture a second higher quality image by following path 912. Path 912 is a distance $d_2$ away from storage rack 902A, which is less than $d_1$. In some embodiments, path 912 also has an associated velocity $v_2$, which is also less than $v_1$. By flying slower and closer to the location where the barcode is expected to be, a higher quality second image may be captured. For example, by flying closer, the image captures a smaller region 922 of the location, which means the number of pixels corresponding to the barcode increases and thus the second image will have greater resolution of the barcode. In addition, by flying slower any motion blur will also be decreased in the second image.

Path 910 may be utilized to quickly perform a large number of inventory validation tasks. By traveling in the center of the aisle, drone 130 may be far away from obstacles, thus enabling it to fly at a fast speed. However, when barcode data fails to match the target barcode, a second image may need to be captured. In some embodiments, a different one of drones 130 may be tasked to follow path 912 to capture the second image. In some embodiments, other machines may be used to follow either path 910 or path 912 for capturing images. For example, cameras may be positioned on forklifts and images may be taken of storage locations while the forklift travels along warehouse aisle performing inventory moving tasks. When barcode data in such images fail to match the target barcodes, warehouse management system 110 or drone management system 120 may request one of drones 130 to follow path 912 to capture a higher quality image.

Figure 10:
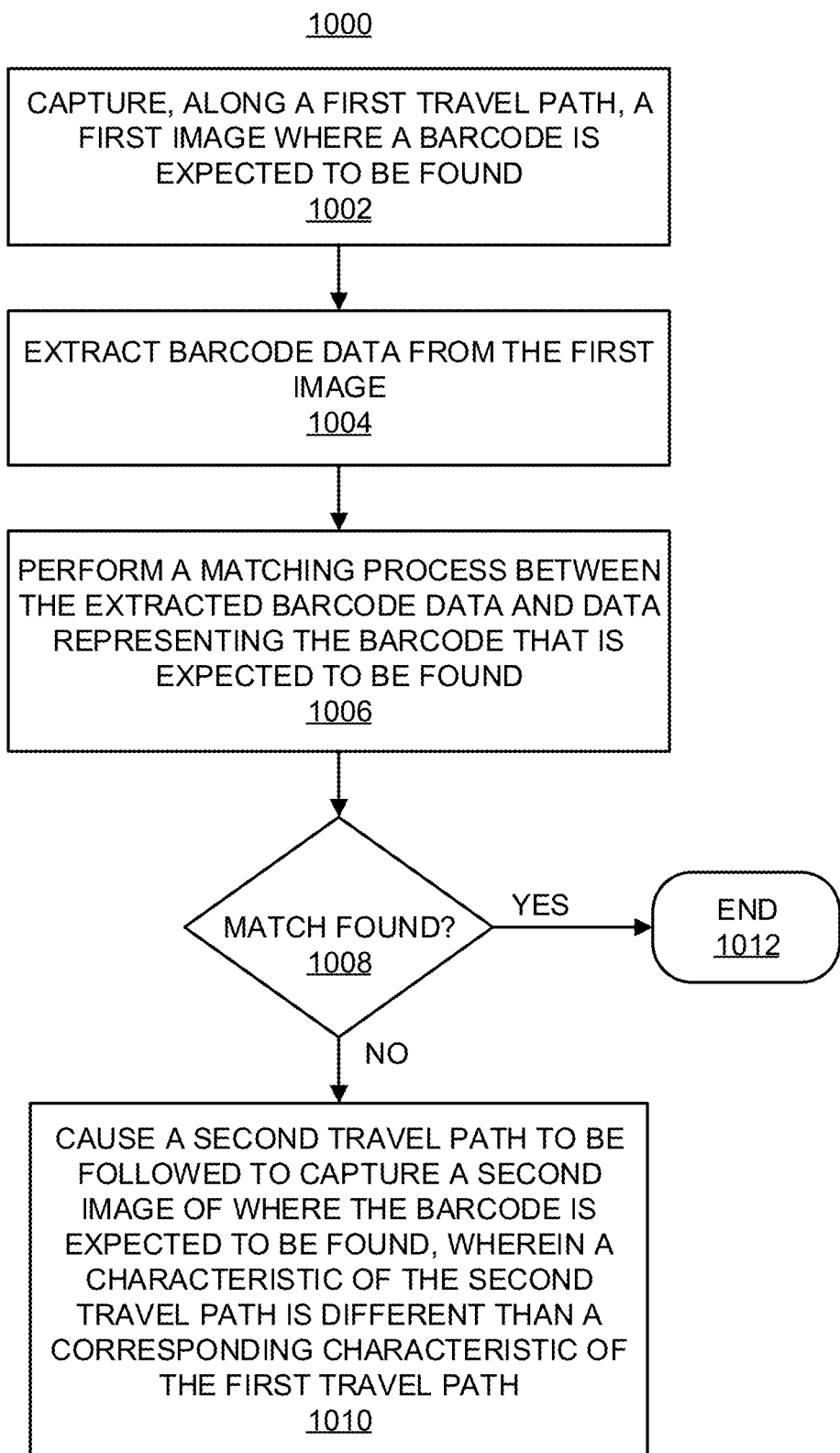
FIG. 10 is a flowchart of an illustrative process for causing a second image to be captured when a match is not found in a first image, in accordance with some embodiments of this disclosure.

FIG. 10 is a flowchart of an illustrative process 1000 for causing a second image to be captured when a match is not found in a first image, in accordance with some embodiments of this disclosure. In various embodiments, the individual steps of process 1000 may be implemented by one or more components of the devices and systems of FIGS. 1 and 2. Although the present disclosure may describe certain steps of process 1000 (and of other processes described herein) as being implemented by certain components of the devices and systems of FIGS. 1 and 2, this is for purposes of illustration only, and it should be understood that other components of the devices and systems of FIGS. 1 and 2 may implement those steps instead.

At 1002, a first image is captured along a first travel path where a barcode is expected to be found. In some embodiments, the image is captured at a location in a warehouse in response to an inventory validation request (e.g., generated by warehouse management system 110 or drone management system 120). The captured image may be of goods stored at a storage area on a storage rack in warehouse. In some embodiments, the image is captured by camera 218 of drone 130 (e.g., an autonomously controlled vehicle). In some embodiments, processing circuitry (e.g., 114, 124, and/or 214) may generate the first travel path. The travel path may be generated based on a map of free space within a warehouse. The travel path may be a shortest or quickest path for a drone 130 to reach the location where the barcode is expected to be found. In some embodiments, the travel path comprises instructions for a person such as a worker to follow to capture the image. In some embodiments, the travel path corresponds to a path a forklift or other device traveled to capture the image. In some embodiments, the travel path comprises a flight path.

At 1004, processing circuitry (e.g., 114, 124, and/or 214) may extract barcode data from the first image. In some embodiments, the barcode is extracted into a vector. In some embodiments, the extraction is performed using steps 402-408 of FIG. 4. In some embodiments, the extraction is performed directly on the image without using the inversion and rotating steps of 404-406 of FIG. 4. For example, once the visual data is detected (e.g., using pattern detection), pixel values corresponding to a centerline, or a different line or lines, of the visual data may be extracted from the image.

In some embodiments, one or more corrections may be applied to account for perspective distortion.

At 1006, processing circuitry (e.g., 114, 124, and/or 214) may perform a matching process between the extracted barcode data and data representing the barcode that is expected to be found. In some embodiments, matching process is performed using steps 606 and 608 of process 600 or steps 710 and 712 of process 700. The matching process at 1006 may be performed using any technique that results in a determination of whether there is a match between the extracted barcode data and data representing the barcode expected to be found.

At decision block 1008, if a match is found the process ends at 1012 and reports back that a match was found. If a match is not found, the process proceeds to 1010.

At 1010, processing circuitry (e.g., 114, 124, and/or 214) may cause a second travel path to be followed to capture a second image of where the barcode is expected to be found. In some embodiments, the first travel path at 1002 may correspond to a path such as path 910 and the second travel path at 1010 may correspond to a path such as path 912. One or more characteristics of the second travel path are different than corresponding characteristics of the first travel path. In some embodiments, the second travel path is closer to the location where the barcode is expected to be found than the first travel path. In some embodiments, the second travel path has a slower path speed at the location where the barcode is expected to be found than the first travel path. In some embodiments, the second travel path corresponds to a different device than the device that traveled the first travel path. For example, the device that travels the second travel path may have a higher resolution camera than the device that traveled the first travel path. In some embodiments, the first and/or second travel paths may be traveled manually or autonomously. In some embodiments, the first and/or second travel paths may be flight paths. In some embodiments, processing circuitry (e.g., 114, 124, and/or 214) may generate the second travel path. The second travel path may be generated similar to the way the first travel path was generated, but with at least one characteristic being different to improve the quality of the second image. In some embodiments, the warehouse management system 110 or the drone management system transmits the second travel path to a drone 130, which causes the drone to follow the second travel path and capture the second image. In some embodiments, drone 130 generates and navigates the second path in response to a failure to find a match at 1008. In some embodiments, a plurality of second images may be captured along the second travel path of where the barcode is expected to be found. For example, if the location comprises a pallet of goods, the plurality of second images may be taken such that, in aggregate, they capture a larger portion of the location (e.g., the entire pallet and goods on the pallet). This way, if the pallet is not properly positioned in the storage location or the barcode is not in the normal location on the goods, the barcode can be properly captured in the plurality of second images.

After the second image or images are captured, the process may repeat steps 1004-1006. If a match is still not found, steps 1010 and then 1004-1006 may be repeated for a third travel path. Process 1000 may be used to quickly and accurately perform a large number of inventory validation tasks. If a system is designed to capture high quality images of all the locations, then this may result in a low image capture rate and a high processing load (e.g., when a higher resolution camera is used). By utilizing multiple travel paths, the vast majority of inventory validation tasks can be performed quickly, and the higher quality images can be optimally used for locations where the higher quality is needed.

Figure 11:
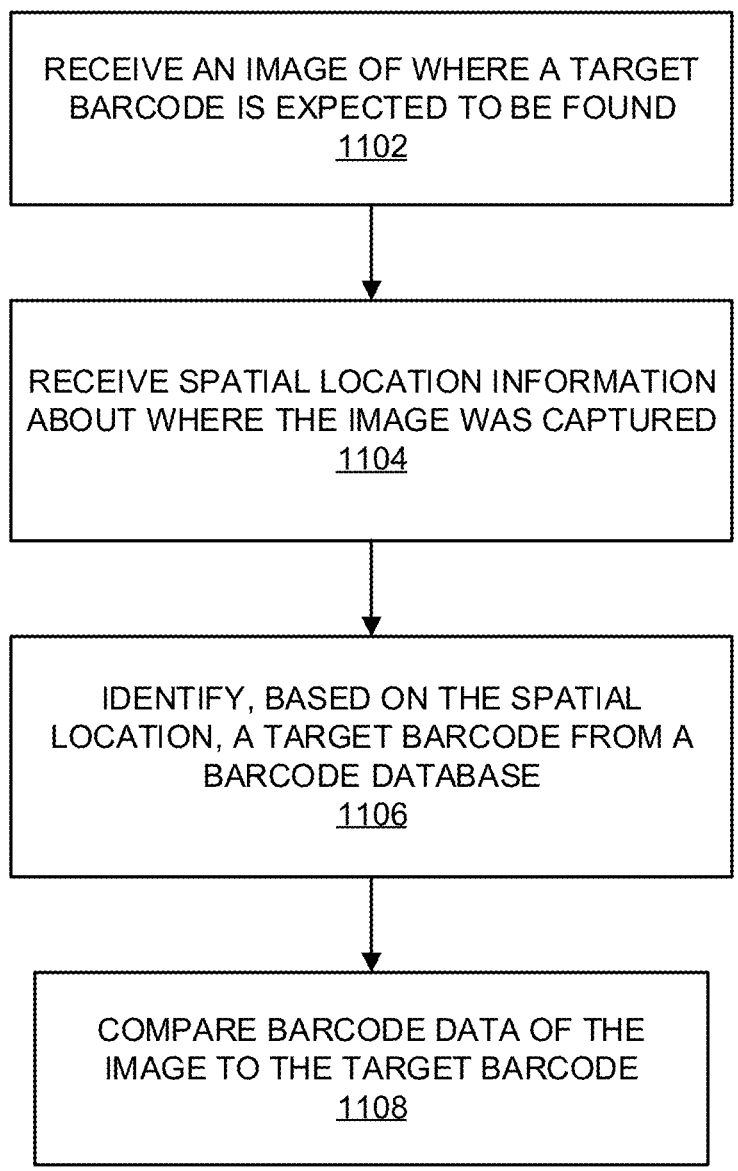
FIG. 11 is a flowchart of an illustrative process for using spatial information to identify a target barcode, in accordance with some embodiments of this disclosure.

FIG. 11 is a flowchart of an illustrative process 1100 for using spatial information to identify a target barcode, in accordance with some embodiments of this disclosure. In various embodiments, the individual steps of process 700 may be implemented by one or more components of the devices and systems of FIGS. 1 and 2. Although the present disclosure may describe certain steps of process 700 (and of other processes described herein) as being implemented by certain components of the devices and systems of FIGS. 1 and 2, this is for purposes of illustration only, and it should be understood that other components of the devices and systems of FIGS. 1 and 2 may implement those steps instead.

At 1102, processing circuitry (e.g., 114, 124, and/or 214) may receive an image of a location where a target barcode is expected to be found. In some embodiments, the image may be captured by drone 130 at a location in the warehouse using camera 218. In some embodiments, drone 130 may travel through the warehouse capturing images of the storage locations (e.g., all storage locations along a storage rack or one level of the rack). This may be performed as part of a general inventory checking process. It will be understood that process 1100 may be performed on any image where a target barcode is expected to be found. In some embodiments, the receiving is performed by communication circuitry 212 receiving the image from camera 218 or processing circuitry 214 receiving the image from communication circuitry 212 or memory 216. In some embodiments, the receiving is performed by warehouse management system 110, drone management system 120, or components thereof.

At 1104, processing circuitry (e.g., 114, 124, and/or 214) may receive spatial location information about where the image was captured. In some embodiments, the image may be captured by drone 130 and the spatial information is generated by sensor 210 (e.g., a localization sensor). As explained above, a localization sensor (e.g., an indoor positioning sensor) can be used for determining the spatial position of the drone in an environment. The localization sensor or associated circuitry may periodically (e.g., multiple times a second on a continuous basis) determine the position (e.g., in three-dimensions) of drone 130 as it navigates through a warehouse. In some embodiments, communication circuitry 212 and/or processing circuitry 214 may receive the spatial information from the localization sensor. In some embodiments, the receiving is performed by warehouse management system 110, drone management system 120, or components thereof. In some embodiments, the image and spatial information are separately received. In some embodiments, the spatial information is associated with and embedded with the image (e.g., by camera 218 or processing circuitry 214) and received together.

At 1106, processing circuitry (e.g., 114, 124, and/or 214) may identify, based on the spatial location, a target barcode from a barcode database. In some embodiments, an environment map of a warehouse associates spatial positions in the warehouse to storage locations. In some embodiments, a barcode database stores barcode identifiers and their corresponding storage locations. Accordingly, processing circuitry can first identify a storage location associated with the spatial location and then use the storage location to identify a target barcode from a barcode database. In some embodiments, the barcode database stores barcodes with corresponding spatial locations such that processing circuitry can directly identify the target barcode from the spatial location. In some embodiments, processing circuitry 214 identifies the target barcode by transmitting the spatial information to warehouse management system 110, which in turn looks up target barcode from barcode database 116 and returns the target barcode.

At 1108, processing circuitry (e.g., 114, 124, and/or 214) may compare the barcode data of the image to the target barcode. The comparison may be performed using any of the techniques described herein. For example, the comparison may be performed using steps 504-508, steps 604-608, and/or steps 702-712. The output of step 1108 may be a measure of similarity, a determination of whether the barcode data matches the target barcode, any other comparison related information, or a combination thereof. In some embodiments, at 1108, the barcode data is first decoded (e.g., to obtain the payload data) and the payload data is compared to the target barcode.

In some embodiments, the output of 1108 may be used by the processing circuitry to determine whether the barcode data matches the target barcode. In some embodiments, when the barcode data does not match the target barcode, the processing circuitry may decode the barcode data to obtain the payload data. In some embodiments, when the barcode data is successfully decoded, the barcode database 116 is updated.

Figure 12:
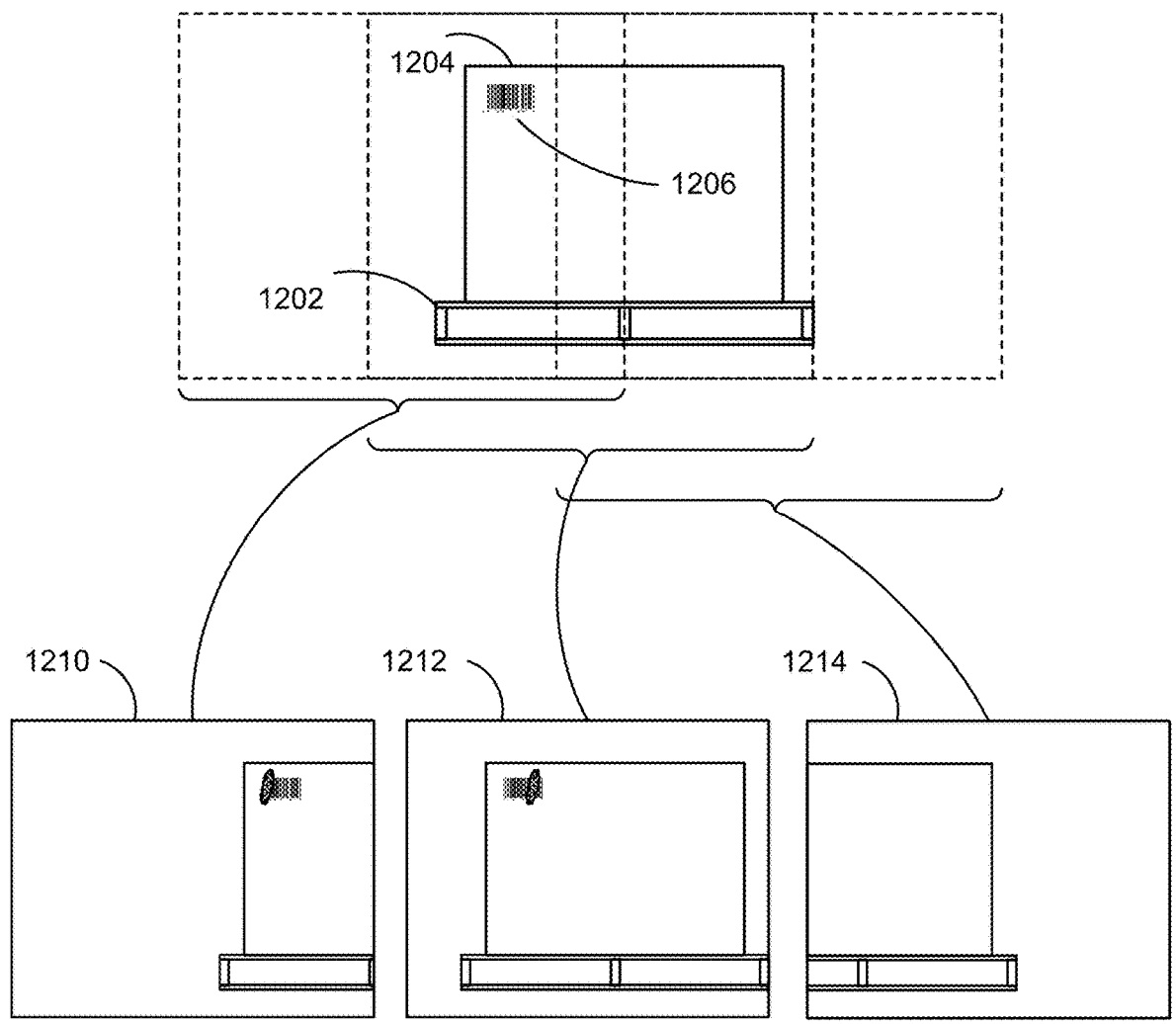
FIG. 12 is a diagram illustrating multiple images captured of a storage location, in accordance with some embodiments of this disclosure.

As a drone 130 or another device travels along a path within a warehouse capturing images of inventory locations, the images may partially overlap such that more than one image captures the location of where a barcode expected to be found. In some embodiments, when an inventory validation task is performed, multiple different images are captured of the inventory location. FIG. 12 is a diagram illustrating multiple images captured of a storage location, in accordance with some embodiments of this disclosure. The storage location contains a pallet 1202 and inventory 1204 resting on the pallet. The storage location also contains a barcode 1206 affixed to inventory 1204. As shown, three images 1210, 1212, and 1214 are captured as a camera travels past the storage location, and the images comprise overlapping views of the storage location. Images 1210 and 1212 both contain barcode 1206, whereas image 1214 does not. Accordingly, either one of images 1210 and 1212 may be used to determine whether the storage location contains a target barcode. Because images 1210 and 1212 were captured while the camera was in different locations, there may be differences in the appearance of barcode 1206. For example, barcode 1206 may be attached directly to inventory 1204 and a clear stretch wrap be applied over barcode 1206. The clear stretch wrap may be reflective such that glare may be present in an image depending on the angle of the camera relative to barcode 1206 and surrounding light sources. As shown, glare is present in images 1210 and 1212, but at different locations based on the different positions of the camera when the images were taken. Accordingly, in some embodiments, the systems and methods of the present disclosure may use multiple images captured from different angles relative to a storage location for performing barcode matching.

Figure 13:
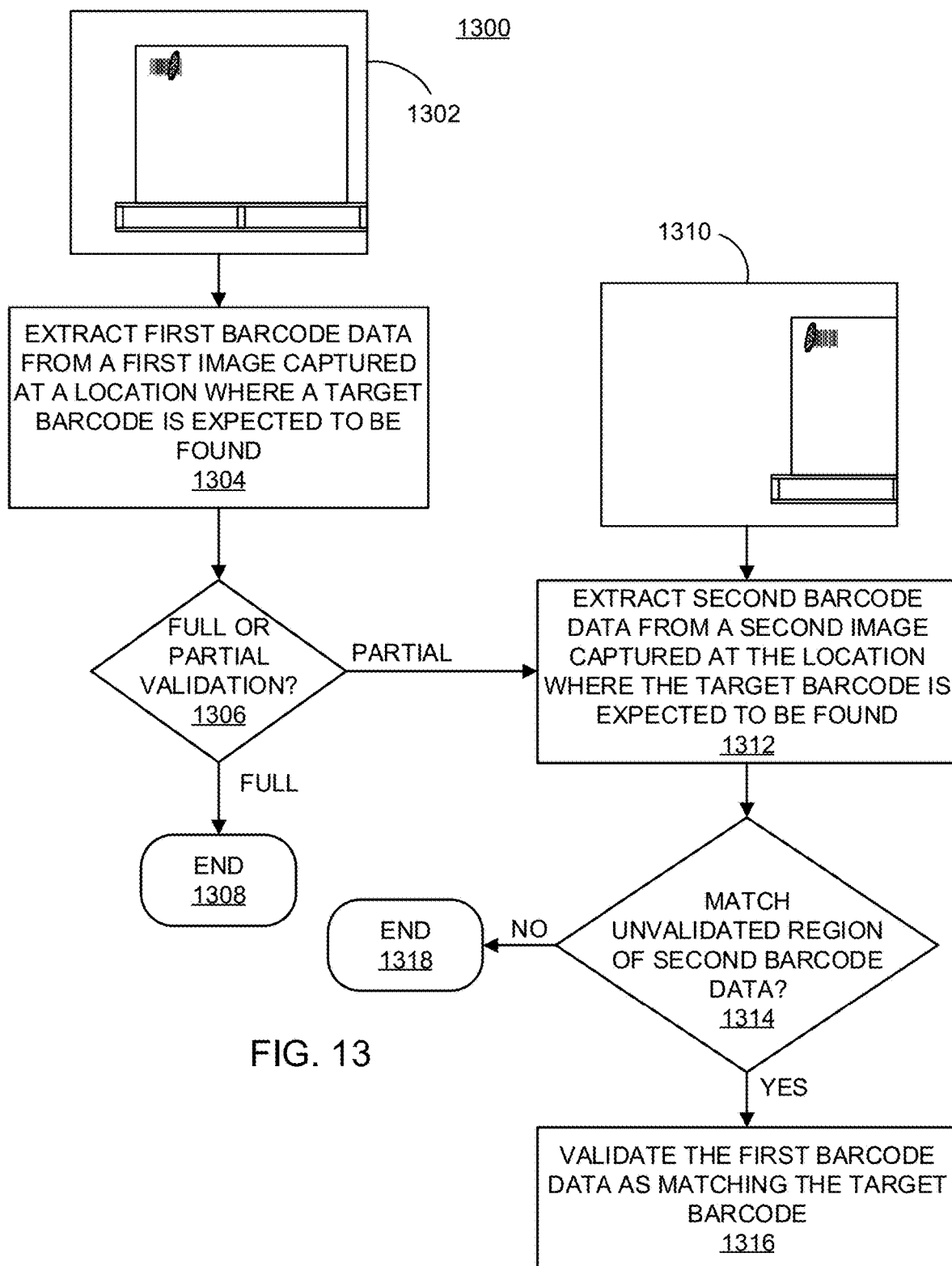
FIG. 13 is a flowchart of an illustrative process for using barcode data from multiple images to perform barcode matching, in accordance with some embodiments of this disclosure.

FIG. 13 is a flowchart of an illustrative process 1300 for using barcode data from multiple images to perform barcode matching, in accordance with some embodiments of this disclosure. In various embodiments, the individual steps of process 1300 may be implemented by one or more components of the devices and systems of FIGS. 1 and 2. Although the present disclosure may describe certain steps of process 1300 (and of other processes described herein) as being implemented by certain components of the devices and systems of FIGS. 1 and 2, this is for purposes of illustration only, and it should be understood that other components of the devices and systems of FIGS. 1 and 2 may implement those steps instead.

At 1304, processing circuitry (e.g., 114, 124, and/or 214) may extract first barcode data from a first image 1302 captured at a location where a target is expected to be found. In some embodiments, the barcode is extracted into a vector. In some embodiments, the extraction is performed using steps 402-408 of FIG. 4. In some embodiments, the extraction is performed directly on the image without using the inversion and rotating steps of 404-406 of FIG. 4. For example, once the visual data is detected (e.g., using pattern detection), pixel values corresponding to a centerline, or a different line or lines, of the visual data may be extracted from the first image. In some embodiments, one or more corrections may be applied to account for perspective distortion. Any extraction technique described herein may be used to extract barcode data from the first image. In some embodiments, image 1302 corresponds to image 1212 and it was captured along with at least one other image at the location.

At 1306, processing circuitry (e.g., 114, 124, and/or 214) may perform a matching process between the extracted first barcode data and data representing the target barcode that is expected to be found. In some embodiments, the matching process is performed using steps 606 and 608 of process 600 or steps 710 and 712 of process 700. The matching process at 1306 may be performed using any technique that results in a determination of whether there is a match between the extracted barcode data and data representing the barcode expected to be found. If a match is found, the first barcode data may be considered validated (e.g., fully validated) and process 1300 reports back that a match was found and ends at 1308. If the first barcode data is instead only partially validated (e.g., the similarity was not sufficiently high enough or only a portion of the extracted first barcode matches the target barcode, process 1300 proceeds to 1312.

Figure 14:
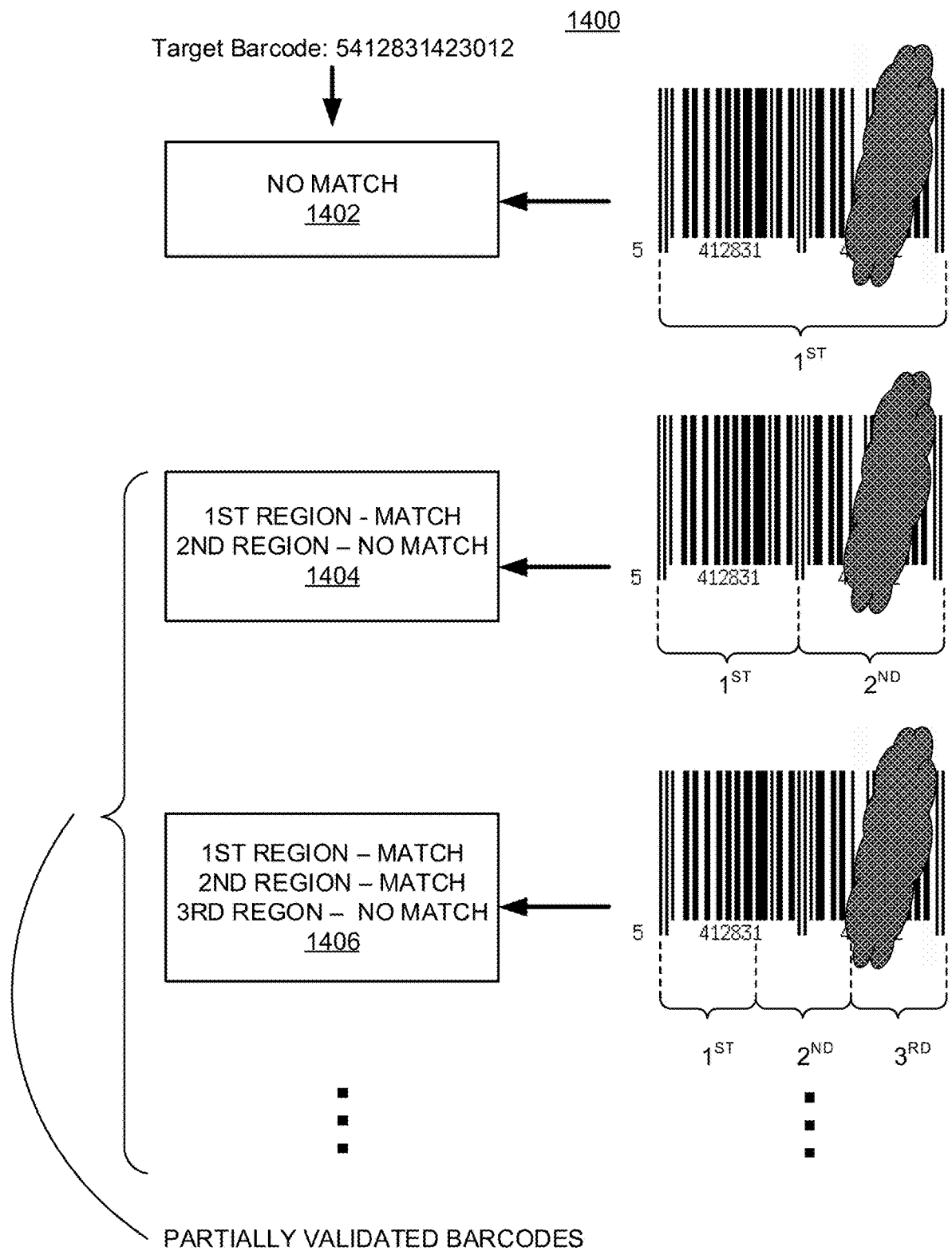
FIG. 14 is a diagram of an illustrative barcode and barcode matching states, in accordance with some embodiments of this disclosure.

FIG. 14 is a diagram 1400 of an illustrative barcode from an image and barcode matching states, in accordance with some embodiments of this disclosure. Diagram 1400 may represent different states determined at 1306. In some embodiments, if a matching process is performed using the entire first barcode data and there is glare as shown, the matching process may determine that there is no match at 1402. However, if the matching process is performed using different portions of the first barcode data and there is glare, the matching process may determine that some of the portions of the first barcode data match and some do not. For example, when two regions are used at 1404, it is determined that the first region matches and the second region does not match. As another example, when three regions are used at 1406, it is determined that the first and second regions match and the third region does not match. Accordingly, the barcode data at 1404 and 1406 may be considered to be partially validated.

In some embodiments, the barcode of diagram 1400 corresponds to barcode 1302. If the matching process at 1306 performs matching on three regions of barcode 1302, then the first and second regions will match and the third region will not match, resulting in a partial validation of barcode 1302.

At 1312, processing circuitry (e.g., 114, 124, and/or 214) may extract second barcode data from a second image 1310 captured at the location where the target is expected to be found. In some embodiments, image 1310 corresponds to image 1210. In some embodiments, image 1302 is centered on the storage location, whereas image 1310 is taken off-center on one side of the storage location. Accordingly, images 1302 and 1310 may have been captured at different angles from the barcode location and the glare from the environment may appear at different locations on the barcode. In some embodiments, at 1312, the barcode from image 1310 is extracted into a vector. In some embodiments, the extraction is performed the same way as at 1304. In some embodiments, the extraction is performed using steps 402-408 of FIG. 4. In some embodiments, the extraction is performed directly on the image without using the inversion and rotating steps of 404-406 of FIG. 4. For example, once the visual data is detected (e.g., using pattern detection), pixel values corresponding to a centerline, or a different line or lines, of the visual data may be extracted from the second image. In some embodiments, one or more corrections may be applied to account for perspective distortion. Any extraction technique described herein may be used to extract barcode data from the second image.

At 1314, processing circuitry (e.g., 114, 124, and/or 214) may perform a matching process between the extracted second barcode data and data representing the barcode that is expected to be found. In some embodiments, the matching process is performed using steps 606 and 608 of process 600 or steps 710 and 712 of process 700. The matching process at 1306 may be performed using any technique that results in a determination of whether there is a match between the extracted barcode data and data representing the barcode expected to be found. In some embodiments, the matching process is only performed on the region or regions of the barcode where no match was found at 1306. If no match is found at 1314, process 1300 may report that the barcode is not validated and end at 1318. If a match is found, the first barcode data may be considered validated (e.g., fully validated) at 1316 and process 1300 reports back that the barcode was validated and ends at 1308.

Process 1300 enables a barcode to be validated even if a single image alone is not sufficient to validate the barcode (e.g., due to glare or an image artifact). Also, by taking multiple images at a location during a single travel path, this can prevent a device from having to travel a second time to the location to capture additional images.

Figure 15:
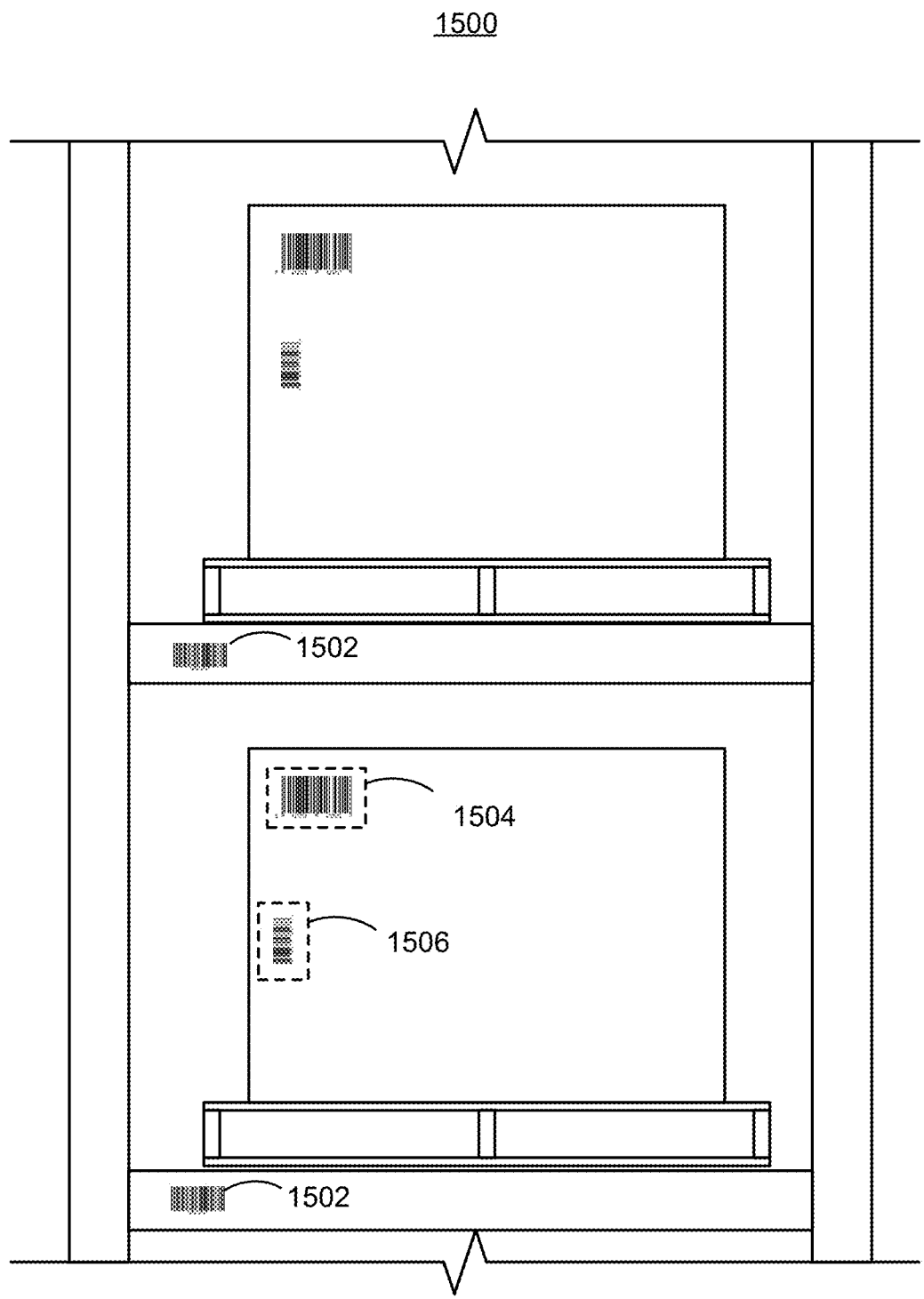
FIG. 15 shows an illustrative elevation view of a warehouse storage rack, in accordance with some embodiments of this disclosure.

FIG. 15 shows an illustrative elevation view of a warehouse storage rack, in accordance with some embodiments of this disclosure. It will be understood that FIG. 15 shows a simplified partial view of two shelves or levels of a storage rack. In some embodiments, each storage location is marked by a different barcode 1502. In some embodiments, the inventory stored at the storage locations may include multiple barcodes. In some embodiments, each barcode may be used for a different purpose. For example, a manufacturer may apply a first barcode and a shipping company may apply a second barcode. In some situations, the warehouse may additionally apply a barcode. In some embodiments, the inventory may include two identical barcodes in different locations or having different orientations. As illustrated, two barcodes, 1504 and 1506 are applied to the inventory at the storage locations. In some implementations, the barcodes are used by warehouse management system 110 to manage inventory. For example, when an inventory moving task is performed, a worker may use a scanner 140 to scan the barcode corresponding to the storage location and one of the inventory barcodes when the inventory is retrieved from a first location and again when the inventory is placed at a second location. In this way, warehouse management system 110 can confirm when an inventory moving task has been completed and use the information from the scans to update barcode database 116. In some embodiments of the present disclosure, multiple barcodes on an object may be used to determine if a location contains a target barcode.

Figure 16:
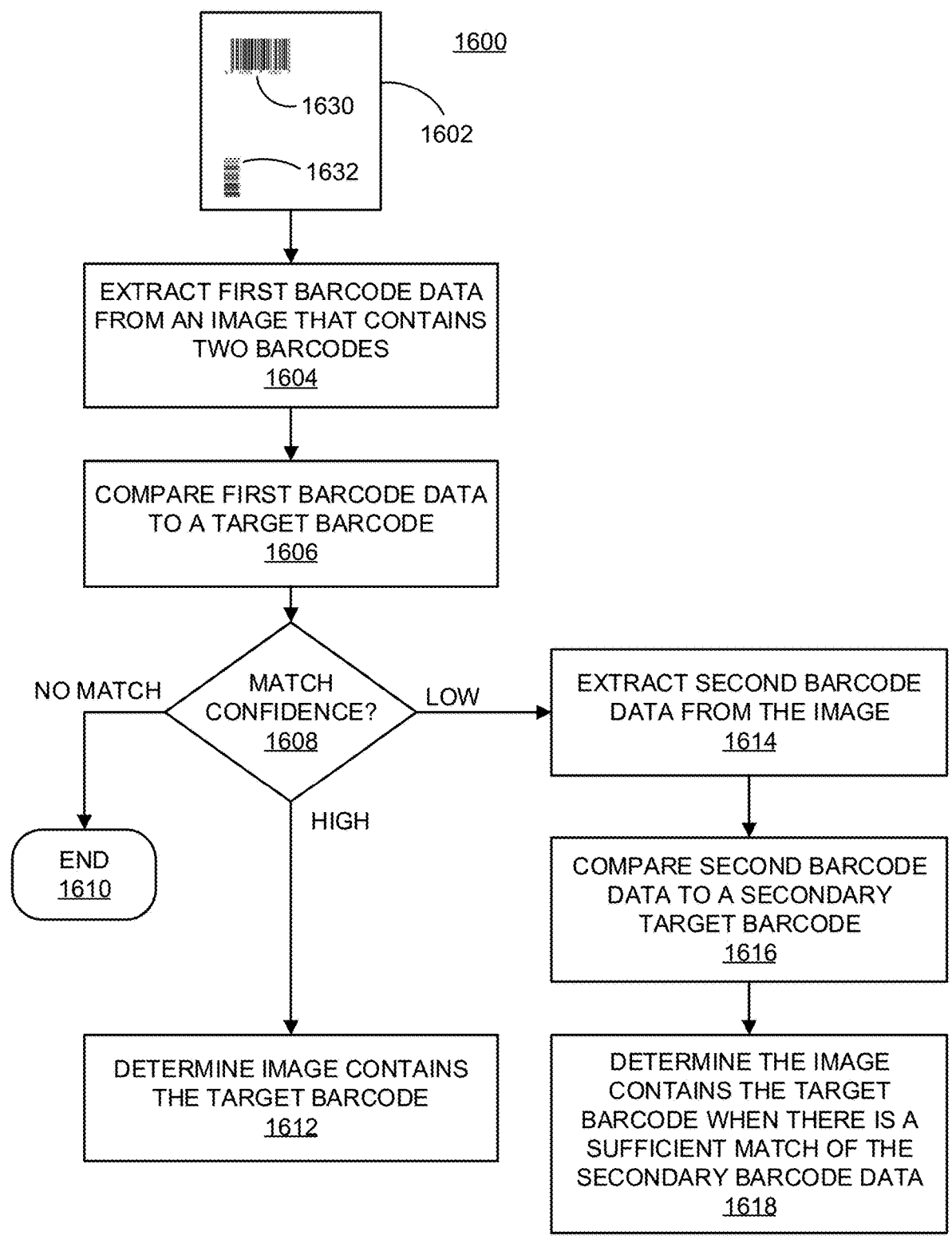
FIG. 16 is a flowchart of an illustrative process for using multiple barcodes from an image to perform barcode matching, in accordance with some embodiments of this disclosure.

FIG. 16 is a flowchart of an illustrative process 1600 for using multiple barcodes from an image to perform barcode matching, in accordance with some embodiments of this disclosure. In various embodiments, the individual steps of process 1600 may be implemented by one or more components of the devices and systems of FIGS. 1 and 2. Although the present disclosure may describe certain steps of process 1600 (and of other processes described herein) as being implemented by certain components of the devices and systems of FIGS. 1 and 2, this is for purposes of illustration only, and it should be understood that other components of the devices and systems of FIGS. 1 and 2 may implement those steps instead.

At 1604, processing circuitry (e.g., 114, 124, and/or 214) may extract first barcode data from an image 1602 that contains two barcodes 1630 and 1632. In some embodiments, barcodes 1630 and 1632 correspond to barcodes 1504 and 1506 in FIG. 15. In some embodiments, barcode 1630 corresponds to a shipping container code (e.g., applied by a shipping company) and barcode 1632 corresponds to a product identifier (e.g., applied by a manufacturer). In some embodiments, the first barcode data corresponds to barcode 1630. In some embodiments, the first barcode data corresponds to barcode 1632. In some embodiments, the first barcode is extracted into a vector. In some embodiments, the extraction is performed using steps 402-408 of FIG. 4. In some embodiments, the extraction is performed directly on the image without using the inversion and rotating steps of 404-406 of FIG. 4. For example, once the first visual data is detected (e.g., using pattern detection), pixel values corresponding to a centerline, or a different line or lines, of the visual data may be extracted from the image. In some embodiments, one or more corrections may be applied to account for perspective distortion. Any extraction technique described herein may be used to extract the first barcode data from the image.

At 1606, processing circuitry (e.g., 114, 124, and/or 214) may compare the first barcode data extracted from the image to the target barcode. The comparison may be performed using any of the techniques described herein. For example, the comparison may be performed using steps 504-508, steps 604-608, and/or steps 702-712. The output of step 1108 may be a measure of similarity (e.g., match confidence), a determination of whether the barcode data matches the target barcode, any other comparison related information, or a combination thereof.

At 1608, processing circuitry (e.g., 114, 124, and/or 214) may evaluate the output at 1606 to determine if there is a high confidence match, a low confidence match, or no match. In some embodiments, a measure of similarity computed at 1606 is compared to one or more similarity thresholds. A first low threshold may be used to determine whether or not there is a match. For example, if the measure of similarity is low, process 1600 may report that the first barcode data does not match and end at 1610. If there is a match, 1608 may determine if it is a high confidence match or a low confidence match. For example, a higher or stricter threshold may be applied to the measure of similarity. When the measure of similarity is higher than the stricter threshold, process 1600 may determine that there is high confidence in the match and, in turn, determine that the image contains the target barcode at 1612. When the measure of similarity indicates a low confidence match (e.g., above a first confidence threshold, but below a second confidence threshold), process 1600 may proceed to 1614. It will be understood that any suitable metrics or criteria may be used to determine if there is a low confidence match. In some situations, a low confidence match is not sufficient to determine whether or not the image contains the target barcode.

At 1614, processing circuitry (e.g., 114, 124, and/or 214) may extract second barcode data from image 1602. In some embodiments, the second barcode data corresponds to barcode 1632. In some embodiments, the second barcode data corresponds to barcode 1630. In some embodiments, the second barcode is extracted into a vector. In some embodiments, the extraction is performed using steps 402-408 of FIG. 4. In some embodiments, the extraction is performed directly on the image without using the inversion and rotating steps of 404-406 of FIG. 4. For example, once the first visual data is detected (e.g., using pattern detection), pixel values corresponding to a centerline, or a different line or lines, of the visual data may be extracted from the image. In some embodiments, one or more corrections may be applied to account for perspective distortion. Any extraction technique described herein may be used to extract the second barcode data from the image.

At 1616, processing circuitry (e.g., 114, 124, and/or 214) may compare the second barcode data extracted from the image to a secondary target barcode. The secondary target barcode may be the same as (e.g., in a different orientation) or different than the target barcode. In some embodiments, warehouse management system 110 stores information about all of the barcodes on the inventory. For example, when an item arrives at a warehouse, all of the barcodes can be scanned and stored in barcode database 116. Accordingly, the secondary target barcode can be retrieved from barcode database 116. The comparison at 1616 may be performed using any of the techniques described herein. For example, the comparison may be performed using steps 504-508, steps 604-608, and/or steps 702-712. The output of step 1108 may be a measure of similarity, a determination of whether the second barcode data matches the secondary target barcode, any other comparison related information, or a combination thereof.

At 1618, processing circuitry (e.g., 114, 124, and/or 214) may determine that the image contains the target barcode when there is a sufficient match of the secondary barcode data to the secondary target barcode. In some embodiments, a measure of similarity computed at 1616 is compared to a threshold to determine if there is a sufficient match of the secondary barcode data. It will be understood that any technique described herein may be used to determine if there is a sufficient match of the secondary barcode data to the secondary target barcode. If at 1616, there is not a sufficient match, the processing circuitry may determine that the image does not contain the target barcode.

By using multiple barcodes captured in an image, process 1600 enables a match to be found between a barcode in an image and a target barcode in situations where a match could not be sufficiently determined if only a single barcode were analyzed.

In accordance with some embodiments of the present disclosure, a method for determining whether an image contains target visual machine-readable data is provided, comprising: inputting a target visual machine-readable data from a target message provider; encoding the target visual machine-readable data into a first vector; capturing an image that may contain a visual machine-readable data; extracting the visual machine-readable data into a second vector; computing a value measuring similarity between the first vector and the second vector by calculating a first interpolation function from the first vector; calculating a second interpolation function from the second vector; processing the first interpolation function and the second interpolation function to scale the first interpolation function and the second interpolation function to a desired range; determining discrepancy between the first interpolation function and the second interpolation function to calculate the computed value measuring similarity; and output the computed value measuring similarity to an output device (e.g., drone management system 120 or warehouse management system 110).

The present disclosure may be practiced as a method or device adapted to practice the method. It is understood that the examples in this application are intended in an illustrative rather than in a limiting sense. In accordance with the present disclosure, limitations of current systems for validating inventory or determining whether a barcode is at a location have been reduced or eliminated. While certain aspects of the present disclosure have been particularly shown and described with reference to exemplary embodiments thereof, it will be understood by those of ordinary skill in the art that various changes in form and details may be made therein without departing from the spirit and scope of the present disclosure as defined by the following claims. It will also be understood that the components of the present disclosure may comprise hardware components or a combination of hardware and software components. The hardware components may comprise any suitable tangible components that are structured or arranged to operate as described herein. Some of the hardware components may comprise processing circuitry (e.g., a processor or a group of processors) to perform the operations described herein. The software components may comprise code recorded on tangible computer-readable medium. The processing circuitry may be configured by the software components to perform the described operations. It is therefore desired that the present embodiments be considered in all respects as illustrative and not restrictive.

What is claimed is:

1. A method, comprising:
    extracting visual data from an image into a first vector;
    comparing a first portion of the first vector to a first portion of a second vector representing target visual data to determine a first measure of similarity;
    comparing a second portion of the first vector to a second portion of a second vector to determine a second measure of similarity; and
    determining whether there is a match between the visual data and the target visual data based on the first measure of similarity and the second measure of similarity.

2. The method of claim 1, wherein the determining whether there is a match comprises:
    applying a first criteria to the first measure of similarity to determine whether the first measure of similarity is sufficient; and
    in response to determining that the first measure of similarity is not sufficient, performing the comparison of the second portion of the first vector to the second portion of the second vector.

3. The method of claim 2, wherein:
    the second portion of the first vector is a subset of the first vector; and the determining whether there is a match comprises:
applying a second criteria to the second measure of similarity to determine whether the second measure of similarity is sufficient.

4. The method of claim 3, wherein determining whether there is a match comprises determining that there is a match in response to determining that the second measure of similarity is sufficient.

5. The method of claim 4, wherein the second criteria is stricter than the first criteria.

6. The method of claim 1, wherein determining whether there is a match between the visual data and the target visual data comprises:
comparing the first measure of similarity to a first threshold; and
comparing the second measure of similarity to a second threshold that is different than the first threshold.

7. The method of claim 1, wherein the first portion corresponds to one or more of company prefix, serial reference, shipper reference, consignment reference, trade item number, product code, or shipping data, wherein the second portion corresponds to a subset of the first portion, and wherein the second portion has higher uniqueness in a barcode database than data of the first portion not included in the second portion.

8. The method of claim 1, further comprising:
comparing a third portion of the first vector to a third portion of a second vector representing target visual data to determine a third measure of similarity,
wherein the determining whether there is a match between the visual data and the target visual data is further based on the third measure of similarity.

9. The method of claim 8, wherein the first portion corresponds to one or more of company prefix, serial reference, shipper reference, consignment reference, trade item number, product code, or shipping data, wherein the second portion corresponds to a subset of the first portion, wherein the third portion corresponds to a subset of the second portion, wherein the third portion has higher uniqueness in a barcode database than data of the second portion not included in the third portion, and wherein the second portion has higher uniqueness in the barcode database than data of the first portion not included in the second portion.

10. The method of claim 1, wherein determining whether there is a match comprises:
applying first criteria to the first measure of similarity to determine whether the first measure of similarity is sufficient;
in response to determining that the first measure of similarity is not sufficient, determining whether an artifact is present in the image that obscures a first region of the visual data; and
selecting the second portion of the first vector that corresponds to a second region of the visual data that is not obscured by the artifact.

11. A system, comprising:
communication circuitry configured to receive an image that contains visual data; and
processing circuitry configured to:
extract the visual data from the image into a first vector;
compare a first portion of the first vector to a first portion of a second vector representing target visual data to determine a first measure of similarity;
compare a second portion of the first vector to a second portion of the second vector to determine a second measure of similarity; and
determine whether there is a match between the visual data and the target visual data based on the first measure of similarity and the second measure of similarity.

12. The system of claim 11, wherein the processing circuitry is configured to determine whether there is a match by:
applying a first criteria to the first measure of similarity to determine whether the first measure of similarity is sufficient; and
in response to determining that the first measure of similarity is not sufficient, performing the comparison of the second portion of the first vector to the second portion of the second vector.

13. The system of claim 12, wherein:
the second portion of the first vector is a subset of the first vector; and
the processing circuitry is configured to determine whether there is a match by:
applying a second criteria to the second measure of similarity to determine whether the second measure of similarity is sufficient.

14. The system of claim 13, wherein the processing circuitry is configured to determine whether there is a match by determining that there is a match in response to determining that the second measure of similarity is sufficient.

15. The system of claim 14, wherein the second criteria is stricter than the first criteria.

16. The system of claim 11, wherein the processing circuitry is configured to determine whether there is a match between the visual data and the target visual data by:
comparing the first measure of similarity to a first threshold; and
comparing the second measure of similarity to a second threshold that is different than the first threshold.

17. The system of claim 11, wherein the first portion corresponds to one or more of company prefix, serial reference, shipper reference, consignment reference, trade item number, product code, or shipping data, wherein the second portion corresponds to a subset of the first portion, and wherein the second portion has higher uniqueness in a barcode database than data of the first portion not included in the second portion.

18. The system of claim 11, wherein the processing circuitry is configured to:
compare a third portion of the first vector to a third portion of a second vector representing target visual data to determine a third measure of similarity,
wherein the processing circuitry configured to determine whether there is a match between the visual data and the target visual data further based on the third measure of similarity.

19. The system of claim 18, wherein the first portion corresponds to one or more of company prefix, serial reference, shipper reference, consignment reference, trade item number, product code, or shipping data, wherein the second portion corresponds to a subset of the first portion, wherein the third portion corresponds to a subset of the second portion, wherein the third portion has higher uniqueness in a barcode database than data of the second portion not included in the third portion, and wherein the second portion has higher uniqueness in the barcode database than data of the first portion not included in the second portion.

20. The system of claim 11, wherein the processing circuitry is configured to determine whether there is a match by:
 applying first criteria to the first measure of similarity to determine whether the first measure of similarity is sufficient;
 in response to determining that the first measure of similarity is not sufficient, determining whether an artifact is present in the image that obscures a first region of the visual data; and
 selecting the second portion of the first vector that corresponds to a second region of the visual data that is not obscured by the artifact.

* * * * *